(12) United States Patent
Fushimi et al.

(10) Patent No.: US 12,528,230 B2
(45) Date of Patent: Jan. 20, 2026

(54) POWDERY-MATERIAL MIXING DEGREE MEASUREMENT DEVICE AND COMPRESSION MOLDING SYSTEM

(71) Applicant: KIKUSUI SEISAKUSHO LTD., Kyoto (JP)

(72) Inventors: Shinsuke Fushimi, Kyoto (JP); Hideyuki Nishimura, Kyoto (JP); Yuuya Kawai, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 781 days.

(21) Appl. No.: 17/307,432

(22) Filed: May 4, 2021

(65) Prior Publication Data

US 2021/0379798 A1  Dec. 9, 2021

(30) Foreign Application Priority Data

Jun. 8, 2020 (JP) ................. 2020-099072

(51) Int. Cl.
*B29B 7/72* (2006.01)
*B29C 43/34* (2006.01)

(52) U.S. Cl.
CPC .............. *B29B 7/726* (2013.01); *B29B 7/728* (2013.01); *B29C 43/34* (2013.01); *B29C 2043/3427* (2013.01)

(58) Field of Classification Search
None
See application file for complete search history.

(56) References Cited

U.S. PATENT DOCUMENTS

| 5,752,788 A * | 5/1998 | Crum ............... B05B 7/1422 406/29 |
| 5,992,772 A * | 11/1999 | Hibner ............ B05B 5/047 406/142 |
| 2018/0162023 A1* | 6/2018 | Kitamura ......... B30B 15/304 |

FOREIGN PATENT DOCUMENTS

| JP | H05293357 A * | 11/1993 |
| JP | 2013028464 A * | 2/2013 |
| JP | 2018-094625 A | 6/2018 |

* cited by examiner

*Primary Examiner* — Abbas Rashid
*Assistant Examiner* — Caroline Beha
(74) *Attorney, Agent, or Firm* — McGinn I.P. Law Group, PLLC

(57) ABSTRACT

A powdery-material mixing degree measurement device includes a supplier configured to be fed with a mixed-powdery materials, a discharger configured to discharge to feed, with the mixed-powdery materials, a filling device configured to fill a die bore of the compression-molding machine with a powdery material, a rotator including a plurality of movable portions and configured to capture the mixed-powdery materials fed through the supplier and to transfer the mixed-powdery materials to the discharger a first sensor configured to measure a mixing degree of the mixed-powdery materials captured by the movable portions of the rotator, a second sensor configured to detect whether or not the mixed-powdery materials in the supplier have an upper surface level kept within a constant target range, and a controller configured to adjust rotational speed of the rotator such that the upper surface level of the mixed-powdery materials in the supplier is kept within the constant target range.

20 Claims, 16 Drawing Sheets

POWDERY-MATERIAL MIXING DEGREE MEASUREMENT DEVICE AND COMPRESSION MOLDING SYSTEM

BACKGROUND

There has been known a rotary compression-molding machine including a table of a turret having die bores, an upper punch, and a lower punch slidably retained above and below each of the die bores, and configured to horizontally rotate the die bores and the punches together to compression mold a powdery material filled in the die bores when the paired upper and lower punches pass between an upper roll and a lower roll.

In the rotary compression-molding machine, the powdery material is filled in the die bores from a feeder disposed just above the table and functioning as a filling device. The feeder can be a gravity feeder configured to simply drop a powdery material into a die bore or an agitated feeder configured to drop, into the die bore, a powdery material being agitated by rotating an incorporated agitating rotor. These feeders are similarly configured to drop the powdery material into the die bore by a gravity force. The rotary compression-molding machine includes a feeder to be fed with a powdery material from a powdery-material feeding device. The powdery-material feeding device can be configured to mix a plurality of types of powdery materials and then deliver the mixed-powdery materials toward the feeder.

The powdery-material feeding device feeds the feeder with mixed-powdery materials at a flow rate not necessarily constant per unit time. The powdery-material feeding device removes any defective powdery material being segregated or the like. This temporarily decreases the flow rate of the powdery material fed from the powdery-material feeding device toward the feeder.

Similarly, the rotary compression-molding machine uses the powdery material having an amount not necessarily constant per unit time. The rotary compression-molding machine conducts a feedback control of measuring pressure to compress the powdery material filled in the die bore with the punches and adjusting an amount of the powdery material filled in the die bore so as to cause the compression pressure to have an approximately required value. In a case where the compression pressure is higher than the target value, the lower punch is raised to reduce the amount of the powdery material filled into the die bore from the feeder. In another case where the compression pressure is lower than the target value, the lower punch is rather lowered to increase the amount of the filled powdery material. The rotary compression-molding machine can thus increase and decrease the amount of the used powdery material.

If the amount of the powdery material fed from the powdery-material feeding device to the rotary compression-molding machine and the amount of the powdery material used by the rotary compression-molding machine are unbalanced, then the powdery material can be possibly short in the feeder or overflow at the feeder or the powdery-material feeding device. This will lead to failure in normal production of a desired molded product. In such a case, the rotary compression-molding machine and the powdery-material feeding device need to be stopped for inspection or cleaning and then be restarted. Such work requires extra labor and time.

In addition, once the turret of the compression-molding machine (hereinafter also referred as molding machine) stops rotating, at a time of restarting the turret, the upper and lower compressing rolls (i.e., the paired upper and lower punches pass between these rolls to cause the powdery material to be compressed and tableted) need to temporarily be spaced apart from each other to decrease the compression pressure from the upper and lower punches in order to reduce a resistance against re-accelerated rotation of the turret and the punches. The compressing rolls are returned to the original positions when a rotational speed is sufficiently increased. Defective molded products are kept produced until the molded products compressed in the die bores have thickness, hardness, density, and weight stabilized (i.e., recovered) to desired values. Such defective molded products need to be discarded wastefully.

In view of this, the turret and the punches of the rotary compression-molding machine have rotational speed adjusted in accordance with a flow rate of the powdery material fed from the powdery-material feeding device (e.g., see JP 2018-094625 A). Increase in the rotational speed of the turret and the punches leads to increase in an amount of a powdery material used in the molding machine per unit time. In contrast, decrease in the rotational speed of the turret and the punches leads to decrease in the amount of the powdery material used per unit time.

The powdery-material feeding device configured to feed the feeder of the molding machine with mixed-powdery materials includes a measurement device configured to measure a powdery-material mixing degree in accordance with near infrared reflectance (NIR), a near infrared absorption spectrum method, or the like. This measurement device irradiates the mixed-powdery materials being transferred with a light wave, such as near infrared light or an electromagnetic wave to measure absorption and/or reflection (i.e., scatter) of the light wave or the electromagnetic wave by the mixed-powdery materials, and to execute a qualitative analysis on uniformity and the like of the mixed-powdery materials and a quantitative analysis based on a spectrum thereof. The powdery-material feeding device removes any defective powdery material having properties such as uniformity departing from a normal range so as not to feed the powdery material to the feeder of the molding machine.

If the mixed-powdery materials to be measured by the measurement device have an inconstant density, then the measurement device leads to a lowered accuracy in analysis of the properties of the powdery materials. Such a lowered accuracy in analysis of the properties of the powdery materials inevitably affects the quality of the molded products obtained by compression molding the powdery materials in the molding machine. Such deterioration in the quality of the molded products cannot be inhibited through adjustment of the rotational speed of the turret and the punches of the molding machine.

SUMMARY OF THE INVENTION

The exemplary invention has been achieved by newly focusing on the above problem, and it is an exemplary feature of the present invention to keep a high analysis accuracy of a measurement device configured to measure a mixing degree of mixed-powdery materials.

The exemplary invention provides a powdery-material mixing degree measurement device configured to measure a mixing degree of mixed-powdery materials containing at least two types of powdery materials and subsequently deliver the mixed-powdery materials toward a compression-molding machine configured to compression mold the mixed-powdery materials. The powdery-material mixing degree measurement device includes a supplier configured to be fed with the mixed-powdery materials, a discharger configured to discharge to feed, with the mixed-powdery materials, a filling device configured to fill a die bore of the compression-molding machine with a powdery material, a rotator including a plurality of movable portions configured to capture the mixed-powdery materials fed through the supplier and transfer the mixed-powdery materials to the discharger, a sensor configured to measure a mixing degree of the mixed-powdery materials captured by the movable portions of the rotator, a sensor configured to detect whether or not the mixed-powdery materials in the supplier has an upper surface level kept within a constant target range, and a controller configured to adjust rotational speed of the rotator such that the upper surface level of the powdery materials in the supplier is kept within the constant target range.

Increase in the rotational speed of the rotator leads to decrease in a flow rate per unit time of a powdery material fed from the supplier to the movable portions of the rotator (i.e., density of the powdery material captured and transferred by the movable portions). In contrast, decrease in rotational speed of the rotator leads to increase in density of the powdery material captured and transferred by the movable portions of the rotator. Such increase in density of the powdery material transferred by the rotator causes decrease in a level of the upper surface of the powdery material in the supplier disposed just above the movable portions, whereas decrease in density of the powdery material transferred by the rotator causes increase in the level of the upper surface of the powdery material in the supplier.

Such a configuration allows the upper surface level of the powdery material in the supplier to be kept within the constant target range by adjustment of the rotational speed of the rotator in the measurement device. This stabilizes density of the mixed-powdery materials fed from the supplier to the movable portions of the rotator (i.e., density of the mixed-powdery materials to be measured by the measurement device), to keep a high accuracy in analysis of the properties of the powdery materials by the measurement device.

More specifically, the rotational speed of the rotator is increased when the upper surface level of the powdery materials in the supplier is equal to or more than an upper limit of the target range in comparison to a contrast case, and the rotational speed of the rotator is decreased when the upper surface level of the powdery materials in the supplier is equal to or less than a lower limit of the target range in comparison to a contrast case.

The sensor, configured to measure the mixing degree of the mixed-powdery materials captured by the movable portions of the rotator, receives particularly transmitted light through the mixed-powdery materials and/or reflected light from the mixed-powdery materials. For analysis of the properties of a powdery material with this type of sensor, it is quite important to keep density of the powdery material as constant as possible for highly kept analysis accuracy.

When the powdery-material mixing degree measurement device further includes a powdery-material remover configured to remove the mixed-powdery materials in the movable portions of the rotator before the mixed-powdery materials reach the discharger, and when the mixing degree of the mixed-powdery materials captured by the movable portions is out of a predetermined range, there is no need to feed the molding machine with mixed-powdery materials having defective properties in order to keep the quality of the molded products compression molded by the molding machine.

The exemplary embodiment provides a powdery-material mixing degree measurement device that is combined with a compression-molding machine to constitute a compression-molding system. The compression-molding machine is of a rotary type and is configured to rotate a turret including a table having a die bore, and punch retaining portions vertically slidably retaining punches disposed above and below the die bore, along with the punches, and fill the die bore with a powdery material from a filling device disposed just above the table, to compress the powdery material filled in the die bore with the punches and obtain a molded product. The compression-molding system further includes a controller configured to a adjust rotational speed of the turret and the punches to cause the powdery material in a feeding pipe directly connected to the filling device and configured to be fed with the powdery material discharged from the discharger of the powdery-material mixing degree measurement device or in the filling device to have an upper surface level kept within a constant target range.

Increase in the rotational speed of the turret and the punches in the rotary compression-molding machine leads to increase in the amount of a powdery material used in the molding machine per unit time. In contrast, decrease in rotational speed of the turret and the punches leads to decrease in the amount of the powdery material used per unit time. Increase in the amount of the powdery material used per unit time leads to decrease in a level of the upper surface of the powdery material in the feeding pipe directly connected to the filling device or in the filling device, whereas decrease in the amount of the powdery material used per unit time leads to increase in the level of the upper surface of the powdery material in the feeding pipe or in the filling device.

This system keeps, within the constant target range, the level of the upper surface of the powdery material in the feeding pipe or in the filling device by adjustment of the rotational speed of the turret and the punches of the molding machine. The rotational speed of the turret is decreased to decrease the amount of the used powdery material before the powdery material in the filling device becomes short, and the rotational speed of the turret is increased to increase the amount of the used powdery material before the powdery material overflows. This prevents a state where the rotary compression-molding machine needs to be stopped.

More specifically, the controller is further configured to increase the rotational speed of the turret and the punches when the level of the upper surface of the powdery material in the feeding pipe or in the filling device is not below an upper limit of the target range, and to decrease the rotational speed of the turret and the punches when the level of the upper surface of the powdery material in the feeding pipe or in the filling device is not above a lower limit of the target range.

The upper surface level of the powdery material significantly decreases in the feeding pipe directly connected to the filling device of the molding machine or in the filling device in an exemplary case where a remover, included in the powdery-material mixing degree measurement device configured to deliver a powdery material toward the feeding pipe, removes a defective powdery material instead of feeding to the feeding pipe. In such a case, the rotational speed of the turret and the punches may be preferably decreased in comparison to the opposite case.

A powdery material is an aggregate of minute solids and conceptually includes an aggregate of particles such as so-called "granules" and an aggregate of powder smaller than such particles. Examples of the powdery material include a powdery material containing a principal agent (i.e., a main ingredient or an active ingredient), an excipient appropriately increasing volume and weight of a molded product, a lubricant preventing the powdery material from adhering to a die bore or a punch, a binder binding particles of the powdery material, starch serving as a disintegrant absorbing moisture to enable easy disintegration of the molded product, and an additive exemplified by a stabilizer stabilizing quality like crystalline cellulose or a carbonate, or a preservative prolonging shelf life. The powdery material according to the exemplary invention also includes a mixture of two or more types of powdery materials, and a mixture of a powdery principal agent and a powdery additive.

The exemplary invention achieves high analysis accuracy kept by the measurement device configured to measure a mixing degree of mixed-powdery materials and prevents the deterioration in the quality of a molded product to be obtained.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
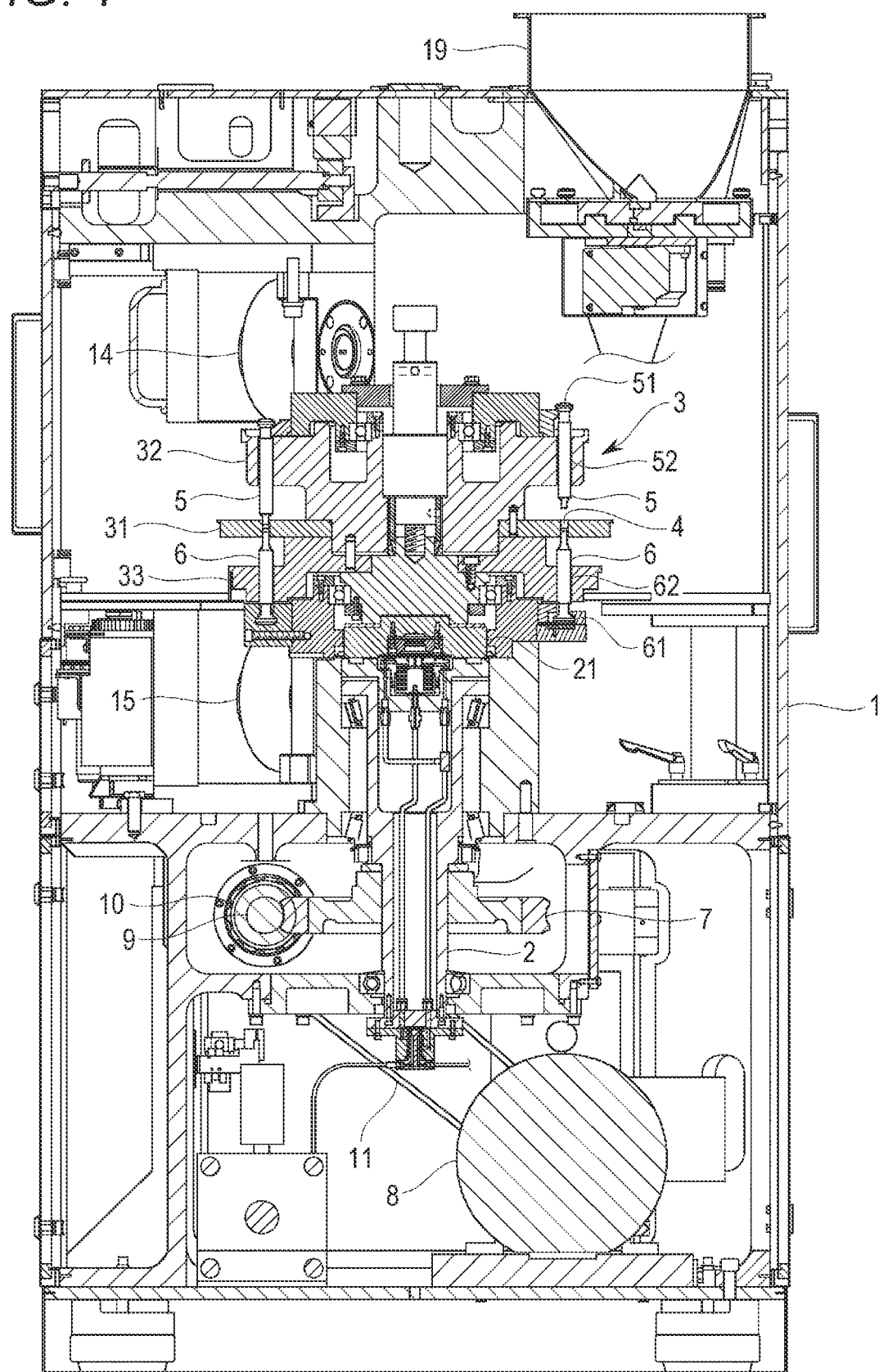
FIG. 1 is a side sectional view of a rotary compression-molding machine according to an embodiment of the exemplary invention.

An exemplary embodiment of the invention will now be described with reference to the drawings. Initially described is an overview of an entire rotary compression-molding machine (hereinafter, referred to as the "molding machine") according to the exemplary embodiment. As shown exemplarily in FIG. 1, the molding machine includes a frame 1 accommodating an upright shaft 2 that functions as a rotary shaft, and a turret 3 that is attached to a connection portion 21 disposed at the top of the upright shaft 2. A worm wheel 7 is attached to the lower end of the upright shaft 2. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to rotate the upright shaft 2 by way of the worm gear 10 and the worm wheel 7. Rotation of the upright shaft 2 causes rotation of the turret 3 and upper and lower punches 5 and 6.

Figure 2:
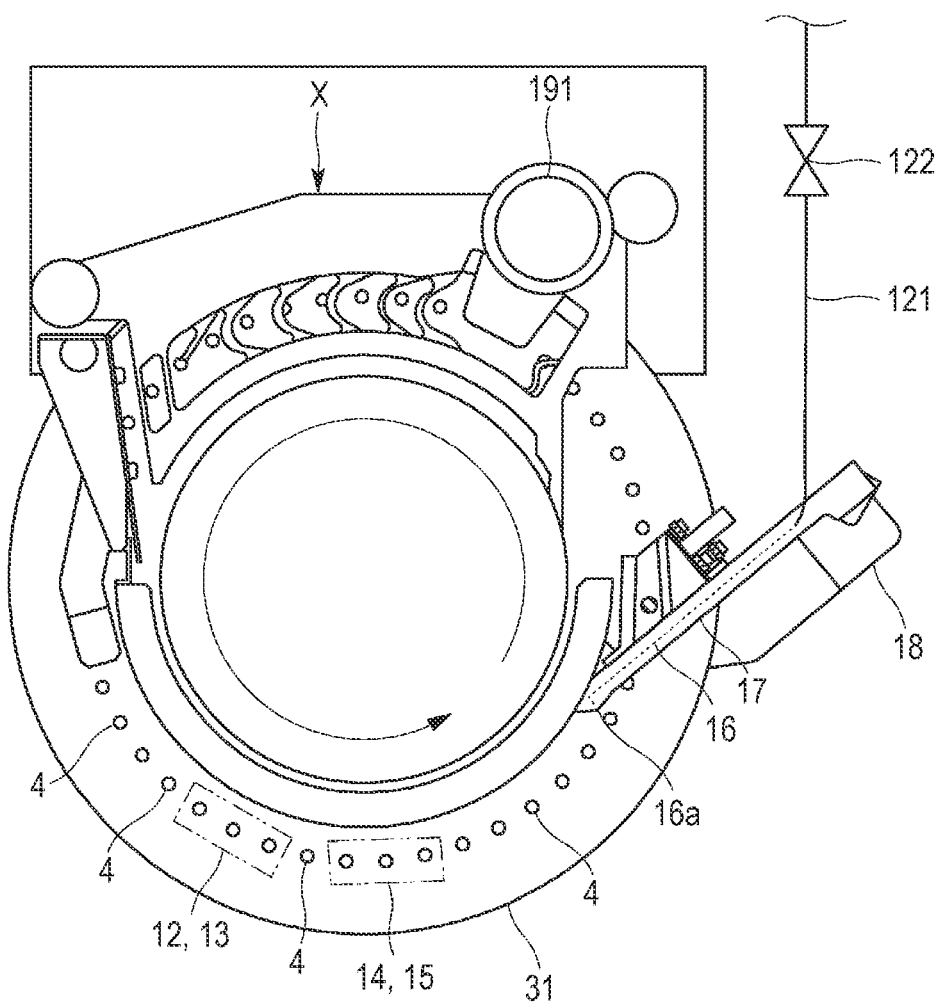
FIG. 2 is a plan view of a main part of the rotary compression-molding machine according to the exemplary embodiment.

The turret 3 horizontally rotates about the upright shaft 2, and more specifically, spins. The turret 3 includes a table (e.g., die disc) 31, an upper punch-retaining portion 32, and a lower punch-retaining portion 33. As shown exemplarily in FIG. 2, the table 31 has a substantially circular disc shape, and has a plurality of die bores 4 that is disposed in an outer circumferential portion and is aligned in a direction of rotation at predetermined intervals. Each of the die bores 4 vertically penetrates the table 31. The table 31 can alternatively include a plurality of divided plates. Instead of the die bores 4 formed directly in the table 31, a die member including the die bores 4 can be attached to the table 31.

The upper and lower punches 5 and 6 are disposed above and below each of the die bores 4 and are individually vertically slidable along the die bores 4. The upper punch-retaining portion 32 retains upper punch trunks 52 while the lower punch-retaining portion 33 retains lower punch trunks 62. The upper punches 5 each have a tip 53 that enters and exits corresponding one of the die bores 4. The lower punches 6 each have a tip 63 that is kept inserted in corresponding one of the die bores 4. The upper and lower punches 5 and 6 horizontally rotate about the upright shaft 2 along with the turret 3, more specifically, revolve.

Figure 14:
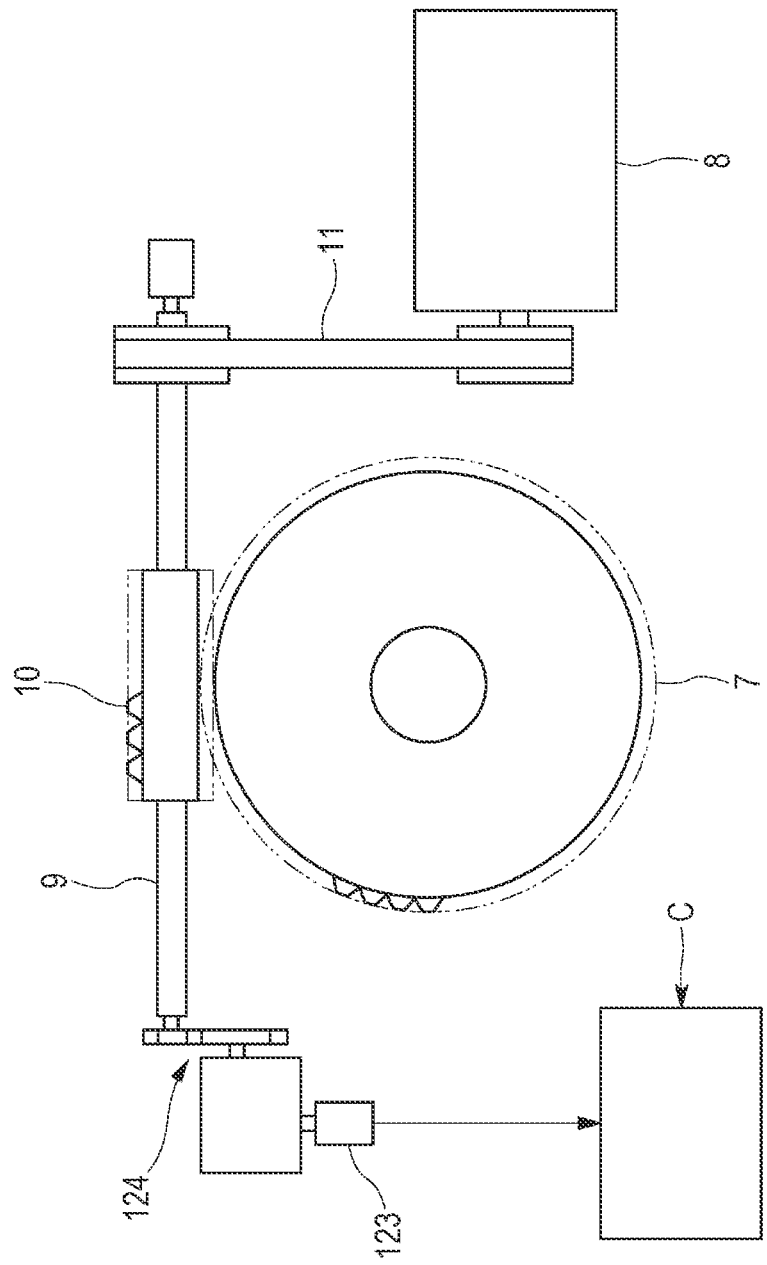
FIG. 14 is a plan view of a main part including a mounting position of a rotary encoder in the rotary compression-molding machine according to the exemplary embodiment.

As shown exemplarily in FIG. 14, the gear shaft 9 has an end connected, via a reduction gear 124, with a rotary encoder 123 configured to detect a rotation angle and rotational speed of the gear shaft 9 as well as (the table 31, the die bores 4, and the punches 5 and 6 of) the turret 3. The rotary encoder 123 outputs a pulse signal every time the gear shaft 9 rotates by a predetermined angle. Upon receipt of a train of the pulse signals, a controller C included in a compression-molding system according to the exemplary embodiment is configured to detect the rotation angle and the rotational speed of the turret 3 (i.e., obtain a current position of each of the die bores 4 on the table 31). The reduction gear 124 reduces the rotational speed of the gear shaft 9 to be adapted to an input speed of the rotary encoder 123 and transmits the reduced rotational speed to the rotary encoder 123.

A feeder X functioning as a filling device is provided to fill the die bores 4 of the turret 3 with a powdery material. The feeder X can be a gravity feeder configured to simply drop a powdery material into the die bores 4 or an agitated feeder configured to drop, into the die bores 4, a powdery material being agitated by rotating an incorporated agitating rotor. The exemplary embodiment assumes that the feeder X is the agitated feeder. The feeder X is positioned on the outer circumferential portion of the rotating table 31, particularly, just above a revolution orbit of the die bores 4. A powdery material is fed to the feeder X from functioning as a discharger M6 of a powdery-material mixing degree measurement device M and a powdery-material feeding pipe 191 (shown exemplarily in FIG. 4). A buffer tank 19 is provided to feed an importing port M5 of the powdery-material mixing degree measurement device M with a powdery material.

Figure 3:
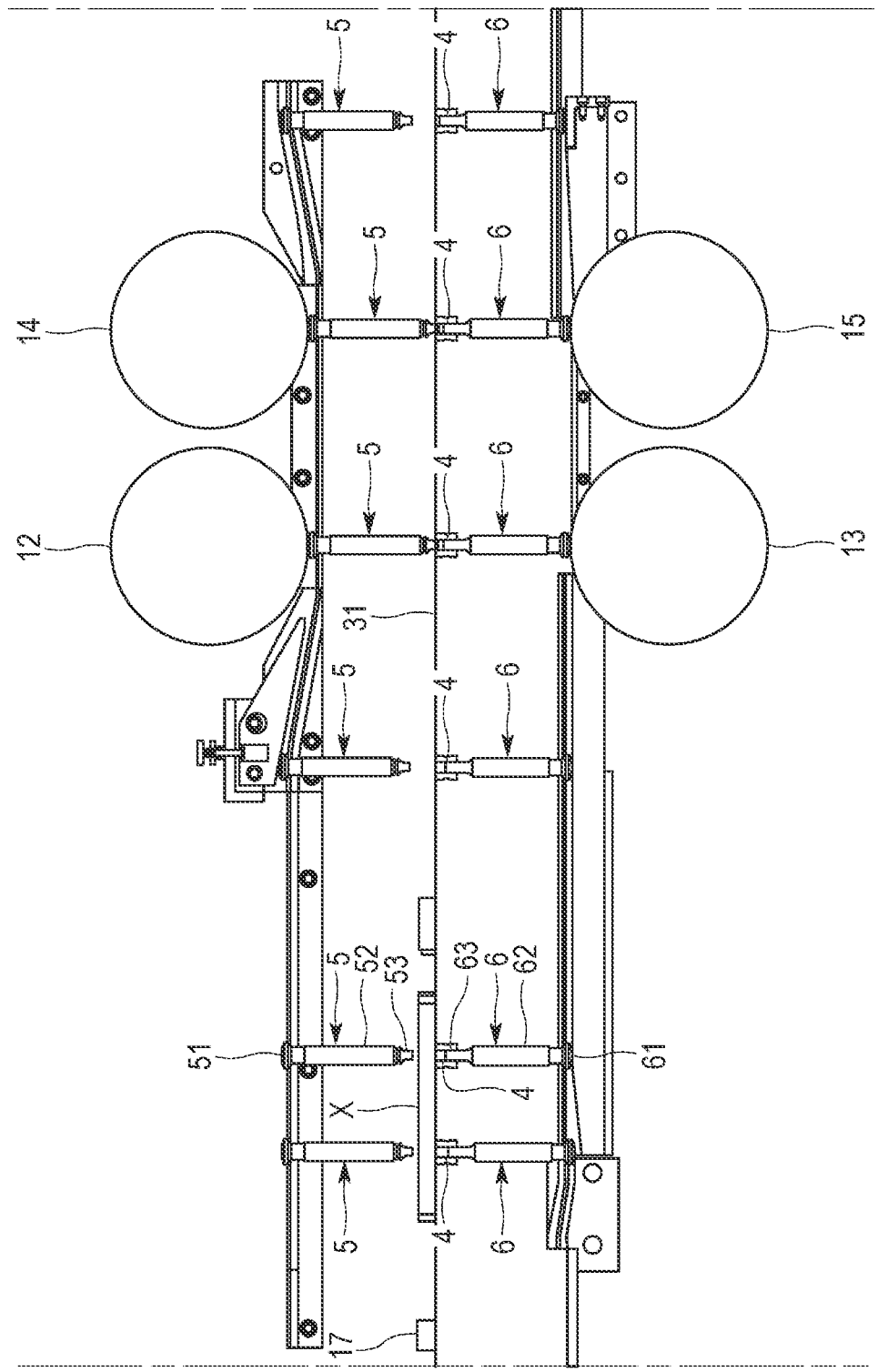
FIG. 3 is a cylindrical view of the rotary compression-molding machine according to the exemplary embodiment.

As shown exemplarily in FIG. 3, a preliminary compression upper roll 12, a preliminary compression lower roll 13, a substantial compression upper roll 14, and a substantial compression lower roll 15 are disposed on orbits of the upper and lower punches 5 and 6 that revolve about the upright shaft 2. The preliminary compression upper roll 12 and the preliminary compression lower roll 13, as well as the substantial compression upper roll 14 and the substantial compression lower roll 15, are respectively paired in the vertical direction so as to sandwich the upper and lower punches 5 and 6. The preliminary compression upper roll 12 and the substantial compression upper roll 14 each press a head 51 of each of the upper punches 5, and the preliminary compression lower roll 13 and the substantial compression lower roll 15 each press a head 61 of each of the lower punches 6. The preliminary compression upper roll 12 and the preliminary compression lower roll 13, as well as the substantial compression upper roll 14 and the substantial compression lower roll 15, bias the upper and lower punches 5 and 6 to come closer to each other, so that end surfaces of the tips 53 and 63 compress from above and below a powdery material filled in the die bores 4.

The upper and lower punches 5 and 6 have the heads 51 and 61 pressed by the rolls 12, 13, 14, and 15, and the trunks 52 and 62 smaller in diameter than the heads 51 and 61. The upper punch-retaining portion 32 of the turret 3 vertically slidably retains the trunks 52 of the upper punches 5, whereas the lower punch-retaining portion 33 vertically slidably retains the trunks 62 of the lower punches 6. The tips 53 and 63 of the trunks 52 and 62 are thinner than the remaining portions and are substantially equal in diameter to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying required pressure to a powdery material in the die bore 4.

Figure 15:
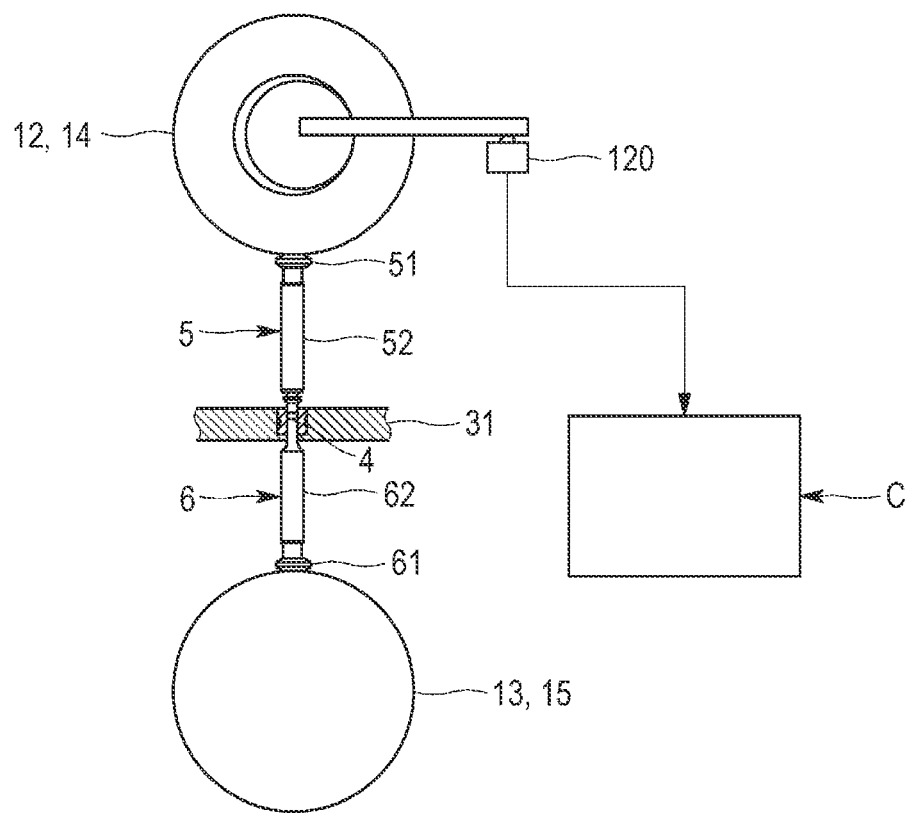
FIG. 15 is a configuration diagram of a roll and a load cell included in the rotary compression-molding machine according to the exemplary embodiment.

As shown exemplarily in FIG. 15, the upper rolls 12 and 14 of the molding machine each have a load cell 120 configured to detect pressure applied to compress the powdery material in the die bore 4 by the rolls 12, 13, 14, and 15 via the punches 5 and 6.

The controller C, according to the exemplary embodiment, receives a signal transmitted from the load cells 120 provided at the rolls 12 13, 14, and 15 to obtain magnitude of a pressure applied to compress the powdery material by the preliminarily compression rolls 12 and 13 (i.e., preliminary compression pressure) and a magnitude of the pressure applied to compress the powdery material by the substantial compression rolls 14 and 15 (i.e., substantial compression pressure). The signals outputted from the load cells 120 form a pulse signal train having a peak when each of the pairs of punches 5 and 6 compresses the powdery material in a corresponding one of the die bores 4 with a maximum pressure. The controller C thus counts the number of pulse signal trains to find the number of molded products produced by the molding machine per unit time.

A molded-product collector is disposed downstream, in the direction of rotation of the turret 3 and the upper and lower punches 5 and 6, of the position where the substantial compression upper roll 14 and the substantial compression lower roll 15 apply pressure. This molded product collector includes a guide member 17 configured to guide a molded product pushed out of each of the die bores 4. The guide member 17 extends to have a proximal end located at a molded-product collecting position 18 and a distal end located closer to the center of the table 31 than a rotation locus of the die bores 4. A molded product pushed out of each of the die bores 4 by the corresponding lower punch 6 comes into contact with the guide member 17 and moves toward the molded product collecting position 18.

A process of producing a molded product will be described roughly. As shown exemplarily in FIG. 3, the lower punch 6 initially descends and the feeder X fills, with a powdery material (i.e., mixed-powdery materials), the die bore 4 into which the tip 63 of the lower punch 6 is inserted (i.e., filling). The lower punch 6 subsequently ascends such that the die bore 4 is filled with a required amount of the powdery material (i.e., mixed-powdery materials), and the powdery material overflowing the die bore 4 is leveled.

The upper punch 5 then descends, and the preliminary compression upper roll 12 and the preliminary compression lower roll 13 press the head 51 of the upper punch 5 and the head 61 of the lower punch 6, such that the tips 53 and 63 of the punches 5 and 6 preliminarily compress the powdery material in the die bore 4. The substantial compression upper roll 14 and the substantial compression lower roll 15 subsequently press the head 51 of the upper punch 5 and the head 61 of the lower punch 6, such that the tips 53 and 63 of the punches 5 and 6 substantially compress the powdery material in the die bore 4 (i.e., compression molding).

The lower punch 6 then ascends until the upper end surface of the tip 63 of the lower punch 6 substantially reaches the level of the upper end of the die bore 4, i.e. the top surface of the table 31, and pushes a molded product out of the die bore 4 onto the surface of the turret 3. The molded product pushed out of the die bore 4 is brought into contact with the guide member 17 by rotation of the turret 3, and moves along the guide member 17 to the molded product collecting position 18.

The molded product collector of the molding machine according to the exemplary embodiment has a molded product removal mechanism W configured to select a specific molded product such as a sampled product or a defective product from among molded products collected at the molded product collecting position 18. Specifically, the guide member 17 is provided therein with an air passage 16 for a pressurized air flow, and the air passage 16 has a distal end functioning as an air spray nozzle 16a opened outward in the radial direction of the turret 3. A flow passage 121 connects an air feed source (not shown) such as a pump configured to feed pressurized air and the air passage 16, and a control valve 122 is disposed on the flow passage 121 to open and close the flow passage 121. Examples of the control valve 122 include an electromagnetic solenoid configured to open in accordance with a control signal transmitted from the controller C or the like.

If the control valve 122 is opened when a specific molded product pushed out of the die bore 4 passes by the air spray nozzle 16a before contacting the guide member 17, then the air spray nozzle 16a discharges pressurized air fed from the air feed source through the flow passage 121 and the air passage 16 in the guide member 17. The discharged air blows the specific molded product outward from the table 31. The blown molded product will not reach the molded-product collecting position 18 ahead of the guide member 17. As described above, the molded-product removal mechanism W in the molding machine includes the passages 16 and 121 for air fed from the air feed source, the spray nozzle 16a, and the control valve 122.

The molded-product removal mechanism W is also configured to sample a tableted molded product.

Described below is a device configured to feed the buffer tank 19 with mixed-powdery materials, specifically, a powdery-material mixing and feeding device Z configured to deliver the mixed-powdery materials toward the feeding pipe 191 directly connected to the feeder X. As shown exemplarily in FIG. 4, the powdery-material mixing and feeding device Z according to the exemplary embodiment includes three measuring feeders Z1 (i.e., Z1a, Z1b, and Z1c). The number of measuring feeders Z1 changes depending on the number of types of powdery materials to be mixed. The powdery-material mixing and feeding device Z can include two, or four or more measuring feeders Z1 with no particular limitation in the number thereof.

The first to third measuring feeders Z1a to Z1c according to the exemplary embodiment measure and feed different types of powdery materials. These measuring feeders Z1a to Z1c can alternatively measure and feed a single type of a powdery material. The first measuring feeder Z1a, the second measuring feeder Z1b, and the third measuring feeder Z1c according to the exemplary embodiment can measure and feed a principal agent, a powdery material of an excipient like lactose or the like, and a lubricant, respectively.

Figure 4:
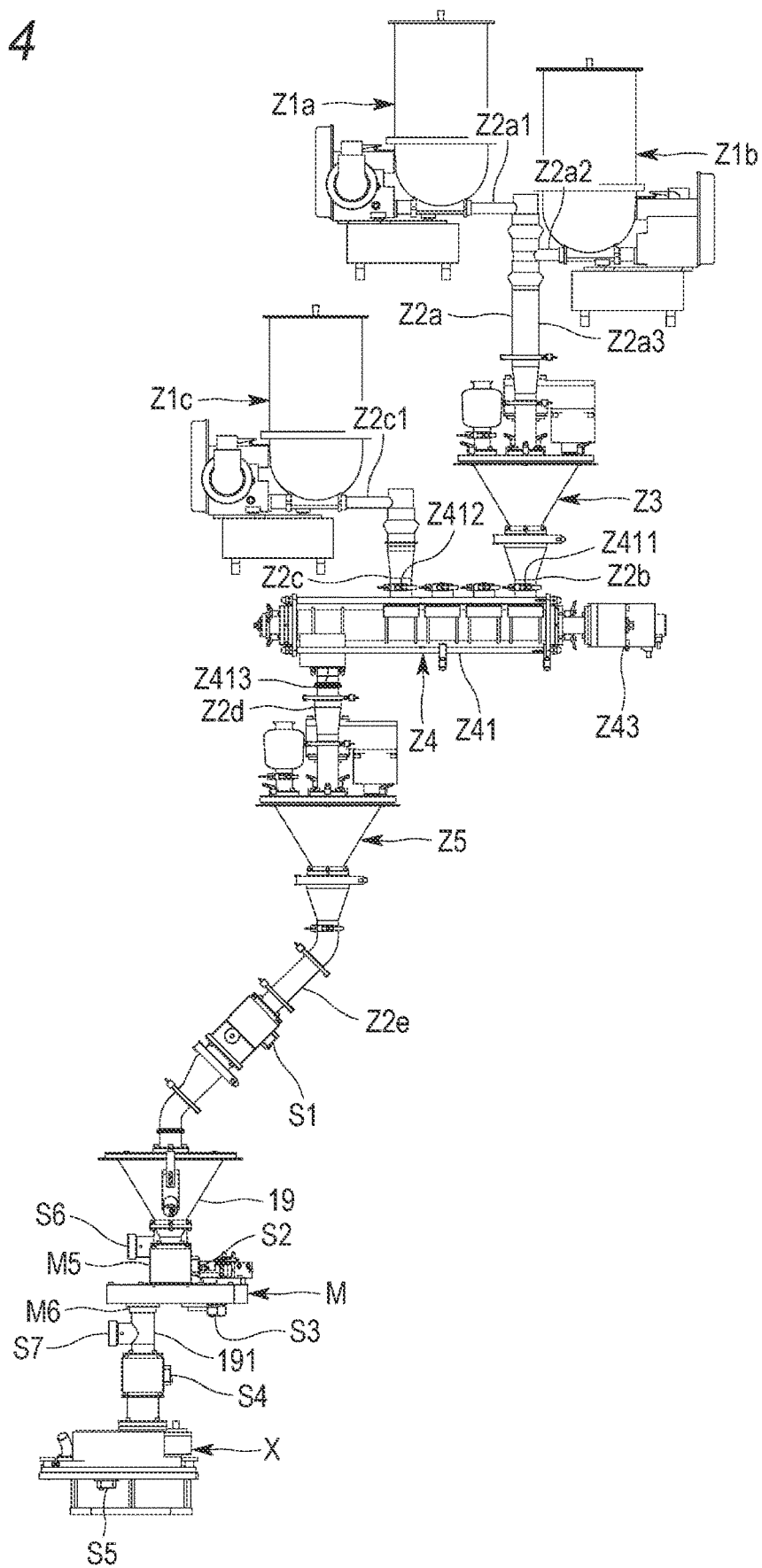
FIG. 4 is a side view of a main part of a powdery-material mixing and feeding device according to the exemplary embodiment.

As shown exemplarily in FIG. 4, the powdery-material mixing and feeding device Z includes the first measuring feeder Z1a, the second measuring feeder Z1b, a vertical mixer Z3 (i.e., a first mixer), a first connecting pipe Z2a connecting the measuring feeders Z1 (i.e., Z1a and Z1b) and the vertical mixer Z3, a horizontal mixer Z4 (i.e., a second mixer), a second connecting pipe Z2b connecting the vertical mixer Z3 and the horizontal mixer Z4, a third connecting pipe Z2c connecting the third measuring feeder Z1c and the horizontal mixer Z4, a vertical mixer Z5 (i.e., a third mixer), a fourth connecting pipe Z2d connecting the horizontal mixer Z4 and the vertical mixer Z5, and a fifth connecting pipe Z2e connecting the vertical mixer Z5 and the buffer tank 19. The measuring feeders (i.e., Z1a, Z1b, and Z1c) can be modified in terms of their disposition, shapes, and the like, and are not limited to the aspect shown exemplarily in FIG. 4.

The first measuring feeder Z1a and the second measuring feeder Z1b measure the powdery materials, namely, the principal agent and the excipient or the like, respectively, and simultaneously feed the first connecting pipe Z2a with the powdery materials. The third measuring feeder Z1c measures the powdery material, namely, the lubricant, and simultaneously feeds the third connecting pipe Z2c with the powdery material (i.e., measuring and feeding). These measuring feeders Z1 are configured in accordance with the known loss in weight system (i.e., a loss integrated value system), and each conduct feedback control of causing weight of a powdery material discharged from the feeder Z1 to be constantly measured with a gravimetric sensor, comparing to find whether or not the weight transitions to achieve a set target discharge flow rate, and increasing or decreasing a discharge rate of the feeder Z1 to reduce a difference between. Measuring the powdery materials to be fed and feeding the connecting pipes Z2a and Z2c with the powdery materials stabilizes contents of the principal agent and the like in a molded product.

As described earlier, the first connecting pipe Z2a connects the first measuring feeder Z1a and the second measuring feeder Z1b to the vertical mixer Z3, and feeds the vertical mixer Z3 with the principal agent discharged from the first measuring feeder Z1a and the excipient or the like discharged from the second measuring feeder Z1b. The second connecting pipe Z2b connects the vertical mixer Z3 and the horizontal mixer Z4, and feeds the horizontal mixer Z4 with the mixed-powdery materials of the principal agent and the excipient discharged from the vertical mixer Z3. The third connecting pipe Z2c connects the third measuring feeder Z1c and the horizontal mixer Z4, and feeds the horizontal mixer Z4 with the lubricant discharged from the third measuring feeder Z1c. The fourth connecting pipe Z2d connects the horizontal mixer Z4 and the vertical mixer Z5, and feeds the vertical mixer Z5 with the mixed-powdery materials of the principal agent and the excipient discharged from the horizontal mixer Z4. The fifth connecting pipe Z2e connects the vertical mixer Z5 and the buffer tank 19, and feeds the buffer tank 19 with the mixed-powdery materials of the principal agent, the excipient, and the lubricant discharged from the vertical mixer Z5.

More specifically, the first connecting pipe Z2a includes a first branch pipe Z2a1 connected with the first measuring feeder Z1a, a second branch pipe Z2a2 connected with the second measuring feeder Z1b, and a main pipe Z2a3 connected with the first branch pipe Z2a1 and the second branch pipe Z2a2. The main pipe Z2a3 has a lower end connected with the vertical mixer Z3. The vertical mixer Z3 thus mixes the powdery materials measured and fed by the first measuring feeder Z1a and the second measuring feeder Z1b (i.e., first mixing).

As shown exemplarily in FIGS. 5 to 7, the vertical mixer Z3, functioning as the first mixer, includes a lid Z36 having a feed port Z361 for a powdery material, a first case Z31 disposed below the lid Z36 and having a funnel shape, an agitation shaft Z33 disposed substantially in the center of the first case Z31 and configured to spin, an agitating rotor Z34 (i.e., first mixing member) attached to the agitation shaft Z33, a motor Z37 configured to rotate (i.e., spin) the agitation shaft Z33, a powdery-material passing member Z32 disposed below the first case Z31 and having a plurality of bores Z321, an auxiliary rotor Z35 (i.e., first mixing member) configured to facilitate a powdery material to pass through the bores Z321 of the powdery-material passing member Z32, and a second case Z38 covering the powdery-material passing member Z32. The agitating rotor Z34 and the auxiliary rotor Z35 each function as the first mixing member. The configuration according to the exemplary embodiment includes both the agitating rotor Z34 and the auxiliary rotor Z35, while the exemplary invention is also applicable to another configuration including only one of the agitating rotor Z34 and the auxiliary rotor Z35.

The agitation shaft Z33 of the vertical mixer Z3 is not necessarily disposed vertically but can be slanted. The vertical mixer Z3 has only to be configured to agitate and mix powdery materials while the powdery materials fed from the feed port Z361 are flowing downward.

The powdery materials fed through the feed port Z361 of the vertical mixer Z3 are mixed by rotation of the agitating rotor Z34 (i.e., first mixing). The powdery materials can alternatively be mixed by rotation of the auxiliary rotor Z35.

The lid Z36 includes the feed port Z361 and a shaft port Z362 allowing the agitation shaft Z33 to pass therethrough, and is shaped to cover an upper opening of the first case Z31. The lid Z36 is attached to the first case Z31 so as to prevent a powdery material from spilling or scattering from the first case Z31. The feed port Z361 of the lid Z36 is connected with the first connecting pipe Z2a. The powdery materials fed from the feed port Z361 into the first case Z31 are agitated and mixed by rotation of the agitating rotor Z34 and/or the auxiliary rotor Z35. The powdery-material passing member Z32 disposed at a reservoir Z30 has the plurality of bores Z321 through which the mixed-powdery materials pass.

Adjustment in the amount of the powdery materials fed from the feed port Z361 or increase in rotational speed of the auxiliary rotor Z35 can cause the powdery materials fed from the feed port Z361 to be larger in amount than the powdery materials passing through the bores Z321. A certain amount of the powdery materials will thus remain in the reservoir Z30. Specifically, at least part of the powdery materials measured and fed by the first measuring feeder Z1a and the second measuring feeder Z1b remain in the reservoir Z30 in the vertical mixer Z3 (i.e., reserving) and are agitated by the auxiliary rotor Z35, to achieve improvement in mixing degree of the powdery materials. There can be included a plurality of feed ports Z361.

The first case Z31 has the open top and the powdery-material passing member Z32 is disposed below the first case Z31. The first case Z31 according to the exemplary embodiment has the substantially funnel shape, while the first case Z31 is not limited to this shape but can have any shape if it is configured to feed the powdery-material passing member Z32 with a powdery material.

The agitation shaft Z33 is disposed in the center of the first case Z31 in a planar view and is driven to rotate (i.e., spin) by the motor Z37. The agitating rotor Z34 is attached to each of the top and the center in the axial direction of the agitation shaft Z33, and the auxiliary rotor Z35 is attached to the lower end in the axial direction of the agitation shaft Z33. Rotation of the agitation shaft Z33 rotates the agitating rotors Z34 and the auxiliary rotor Z35.

The agitating rotors Z34 (i.e., first mixing members) agitate and mix the powdery materials fed from the feed port Z361 into the first case Z31. The agitating rotors Z34 can have any shape. The agitating rotors Z34 shown exemplarily in FIG. 5 have a rectangular distal end and are disposed at two positions on the agitation shaft Z33. The vertical mixer Z3 shown exemplarily in FIG. 7 is configured partially differently from the vertical mixer Z3 shown exemplarily in FIG. 5. The vertical mixer Z3 shown exemplarily in FIG. 7 includes the agitating rotor Z34 disposed at a single position on the agitation shaft Z33 and shaped differently from the agitating rotors Z34 shown exemplarily in FIG. 5. The agitating rotors Z34 are not limited in terms of their shapes or positions to those shown exemplarily in FIGS. 5 and 7.

As shown exemplarily in FIG. 6, the powdery-material passing member Z32 at the reservoir Z30 is disposed below the first case Z31 and includes the plurality of bores Z321. The powdery-material passing member Z32 is covered with the second case Z38. A powdery material passing through the bores Z321 of the powdery-material passing member Z32 is discharged from a discharge port Z381 disposed at the bottom of the second case Z38. The number and the diameter of the bores Z321 are set appropriately. Such a configuration allows powdery materials to remain at the powdery-material passing member Z32 and achieves improvement in mixing degree of the powdery materials. A powdery material passing through the bores Z321 of the powdery-material passing member Z32 in a first vertical mixer Z3a is fed to the horizontal mixer Z4 by way of the second connecting pipe Z2b.

The auxiliary rotor Z35 agitates a powdery material in the reservoir Z30. The auxiliary rotor Z35 is disposed in the center of the reservoir Z30 in a planar view and is attached to the lower end of the agitation shaft Z33. The auxiliary rotor Z35 according to the exemplary embodiment is shaped to follow the inner shape of the powdery-material passing member Z32 and facilitates a powdery material to pass through the bores Z321. The auxiliary rotor Z35 is also configured as a type of an agitating rotor.

The vertical mixer Z3 according to the exemplary embodiment includes the agitating rotor Z34. The vertical mixer Z3 can alternatively be configured by the second case Z38, the powdery-material passing member Z32, and the auxiliary rotor Z35. The second case Z38 covers the powdery-material passing member Z32, has a substantially funnel shape, and has the discharge port Z381 at the bottom. The second case Z38 guides a powdery material passing through the bores Z321 of the powdery-material passing member Z32 to the discharge port Z381.

The second connecting pipe Z2b connects the vertical mixer Z3 and the horizontal mixer Z4. The second connecting pipe Z2b is connected to the bottom of the vertical mixer Z3 and the top of the horizontal mixer Z4, and feeds the horizontal mixer Z4 with the powdery materials passing through the discharge port Z381 of the vertical mixer Z3.

Figure 8:
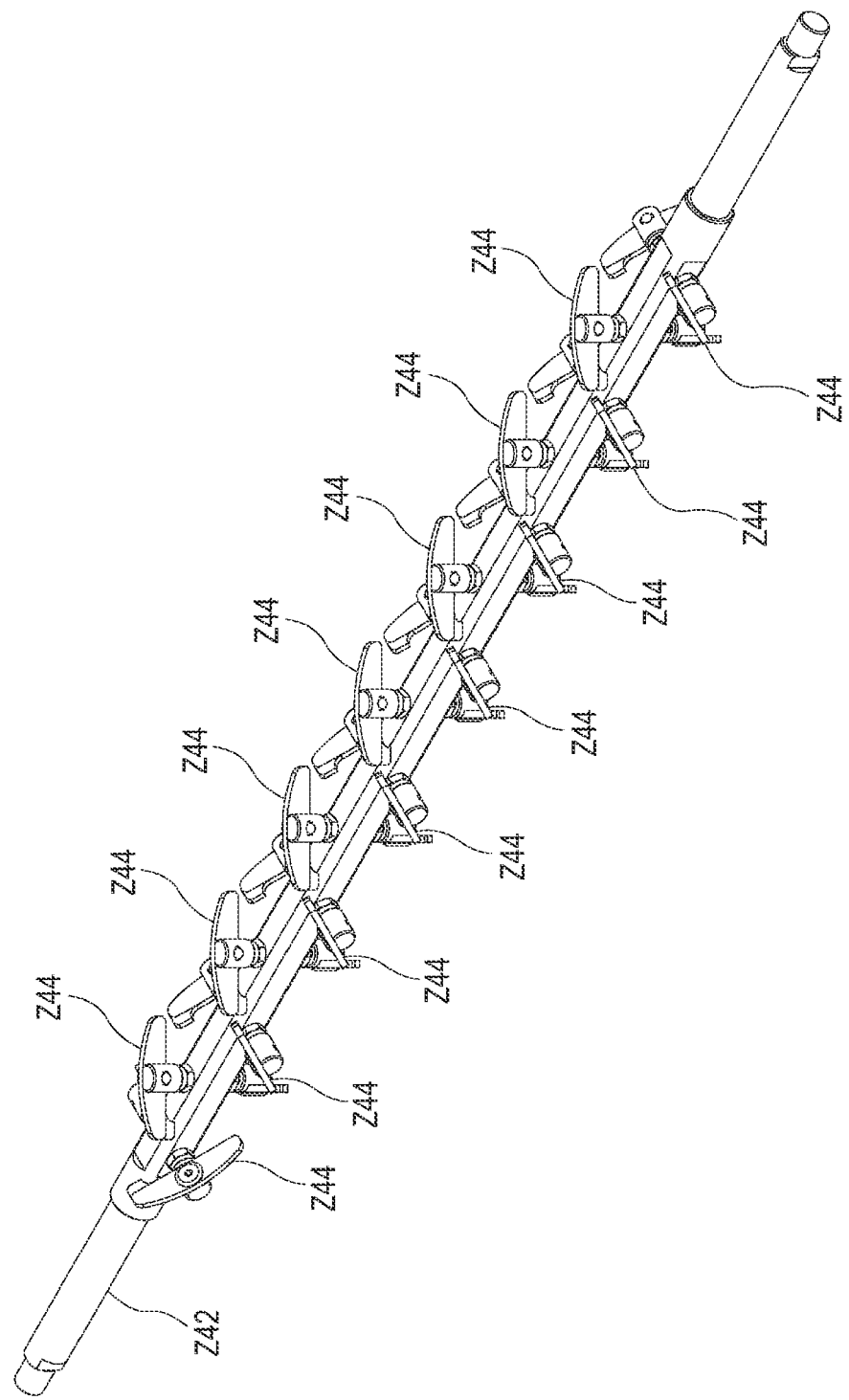
FIG. 8 is a perspective view of an agitation shaft and an agitating rotor (e.g., second mixing member) of a horizontal mixer included in the powdery-material mixing and feeding device according to the exemplary embodiment.

As shown exemplarily in FIGS. 4 and 8, the horizontal mixer Z4 functioning as the second mixer includes a cylindrical case Z41, an agitation shaft Z42 disposed substantially in the center of the case Z41 and configured to spin, a motor Z43 configured to rotate (i.e., spin) the agitation shaft Z42, and an agitating rotor Z44 attached to the agitation shaft Z42 and configured to rotate to move a powdery material substantially horizontally. The horizontal mixer Z4 mixes the fed powdery materials, namely, the principal agent and the excipient or the like with the lubricant (i.e., second mixing). The case Z41 according to the exemplary embodiment does not rotate (i.e., spin), but can alternatively be configured to rotate. This may achieve further improvement in mixing degree of the powdery materials.

The case Z41 has a top including a plurality of feed ports that allows powdery materials to be fed into the case Z41, and a discharge port Z413 that allows mixed-powdery materials to be discharged from the case Z41. The configuration according to the exemplary embodiment includes two feed ports (e.g., first and second feed ports Z411 and Z412), and the second connecting pipe Z2b is connected to the first feed port Z411 of the case Z41 of the horizontal mixer Z4. The first feed port Z411 feeds the case Z41 with the mixed-powdery materials of the principal agent and the excipient or the like. The agitating rotor Z44 rotates to move the mixed-powdery materials fed into the case Z41 toward the discharge port Z413 of the case Z41. The second feed port Z412 feeds the lubricant from the third connecting pipe Z2c. The agitation shaft Z42 and the agitating rotor Z44 rotate to move the lubricant fed into the case Z41 toward the discharge port Z413 of the case Z41. Any of the feed ports not in use will be closed by a lid.

The discharge port Z413 is disposed at the bottom of the case Z41. The discharge port Z413 is connected with the fourth connecting pipe Z2d. The agitating rotor Z44 rotates to discharge the mixed-powdery materials from the case Z41 through the discharge port Z413 to the fourth connecting pipe Z2d.

The agitation shaft Z42 extends in a longitudinal direction of the case Z41 and is disposed substantially in the center in a sectional view. The agitation shaft Z42 is driven to rotate (i.e., spin) by the motor Z43. As shown exemplarily in FIG. 8, the agitating rotor Z44 is attached to the agitation shaft Z42. Rotation of the agitation shaft Z42 causes rotation of the agitating rotor Z44 to simultaneously mix and move the powdery materials toward the discharge port Z413.

The agitating rotor Z44 is configured to agitate and mix the powdery materials fed into the case Z41 through the feed ports (e.g., Z411 and Z412). The agitating rotor Z44 can have any shape, but is preferably configured to simultaneously mix and move the powdery materials toward the discharge port Z413. As shown exemplarily in FIG. 8, the agitating rotor Z44 according to the exemplary embodiment is shaped to have expanded both ends, and is attached to the agitation shaft Z42 at a freely adjustable angle.

The third measuring feeder Z1c is configured to measure and feed a lubricant to the horizontal mixer Z4. The third connecting pipe Z2c is connected to the bottom of the third measuring feeder Z1c. The lubricant in the third measuring feeder Z1c is fed to the horizontal mixer Z4 through the third connecting pipe Z2c (i.e., lubricant feeding). The lubricant can alternatively be fed to the horizontal mixer Z4 by a μR feeder (e.g., manufactured by Nisshin Engineering Inc.). The lubricant can still alternatively be fed to the horizontal mixer Z4 by an atomizer (i.e., spray device).

The third connecting pipe Z2c includes a branch pipe Z2c1 and a main pipe Z2c2. The branch pipe Z2c1 has a first end connected to the bottom of the third measuring feeder Z1c, and a second end connected to the main pipe Z2c2. The lower end of the main pipe Z2c2 is connected to the second feed port Z412 of the horizontal mixer Z4.

The fourth connecting pipe Z2d connects the horizontal mixer Z4 and the vertical mixer Z5. The fourth connecting pipe Z2d is connected to the bottom of the horizontal mixer Z4 and the top of the vertical mixer Z5, and feeds the vertical mixer Z5 with the powdery materials passing through the discharge port Z413 of the horizontal mixer Z4.

Figure 5:
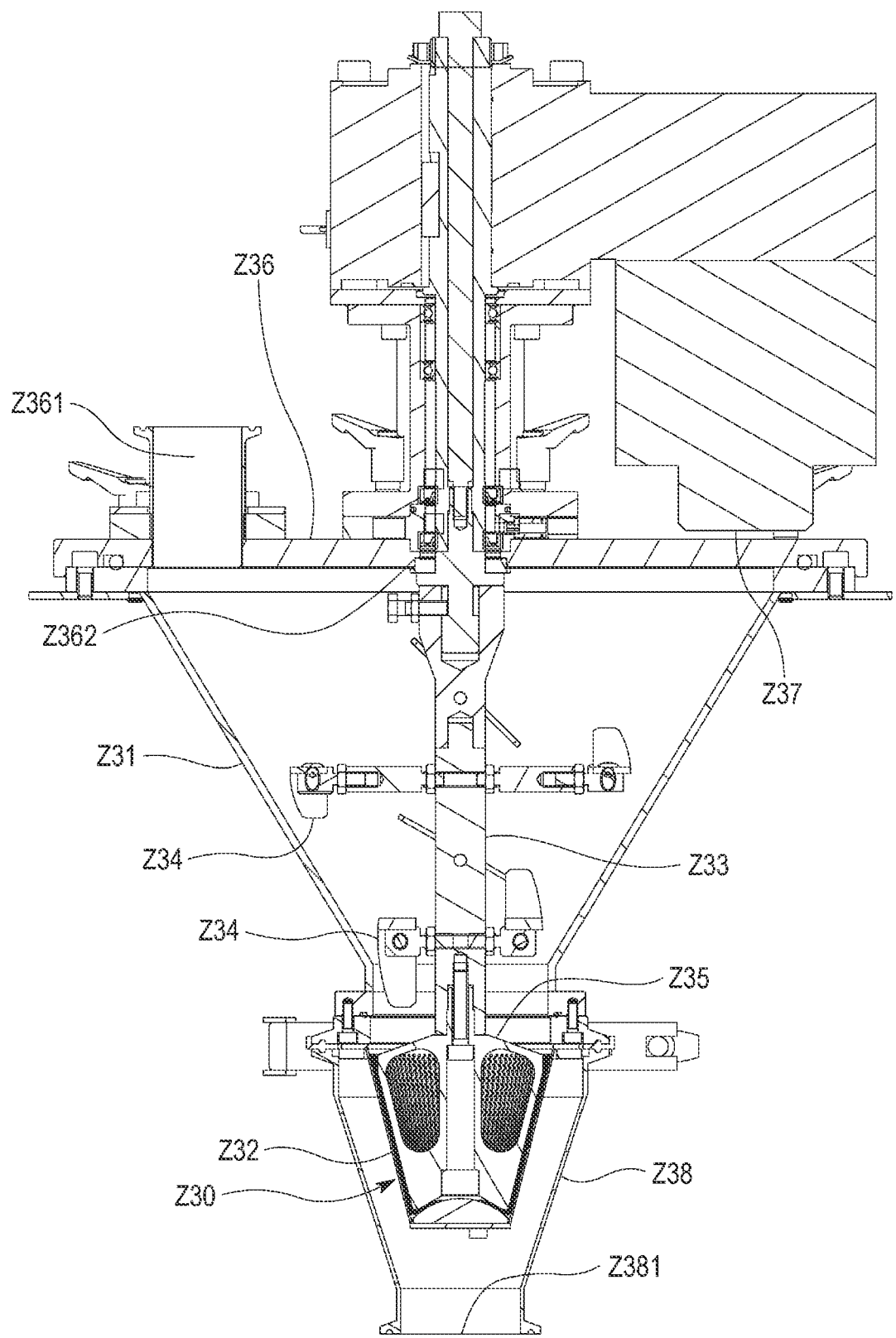
FIG. 5 is a side sectional view of a vertical mixer included in the powdery-material mixing and feeding device according to the exemplary embodiment.
Figure 6:
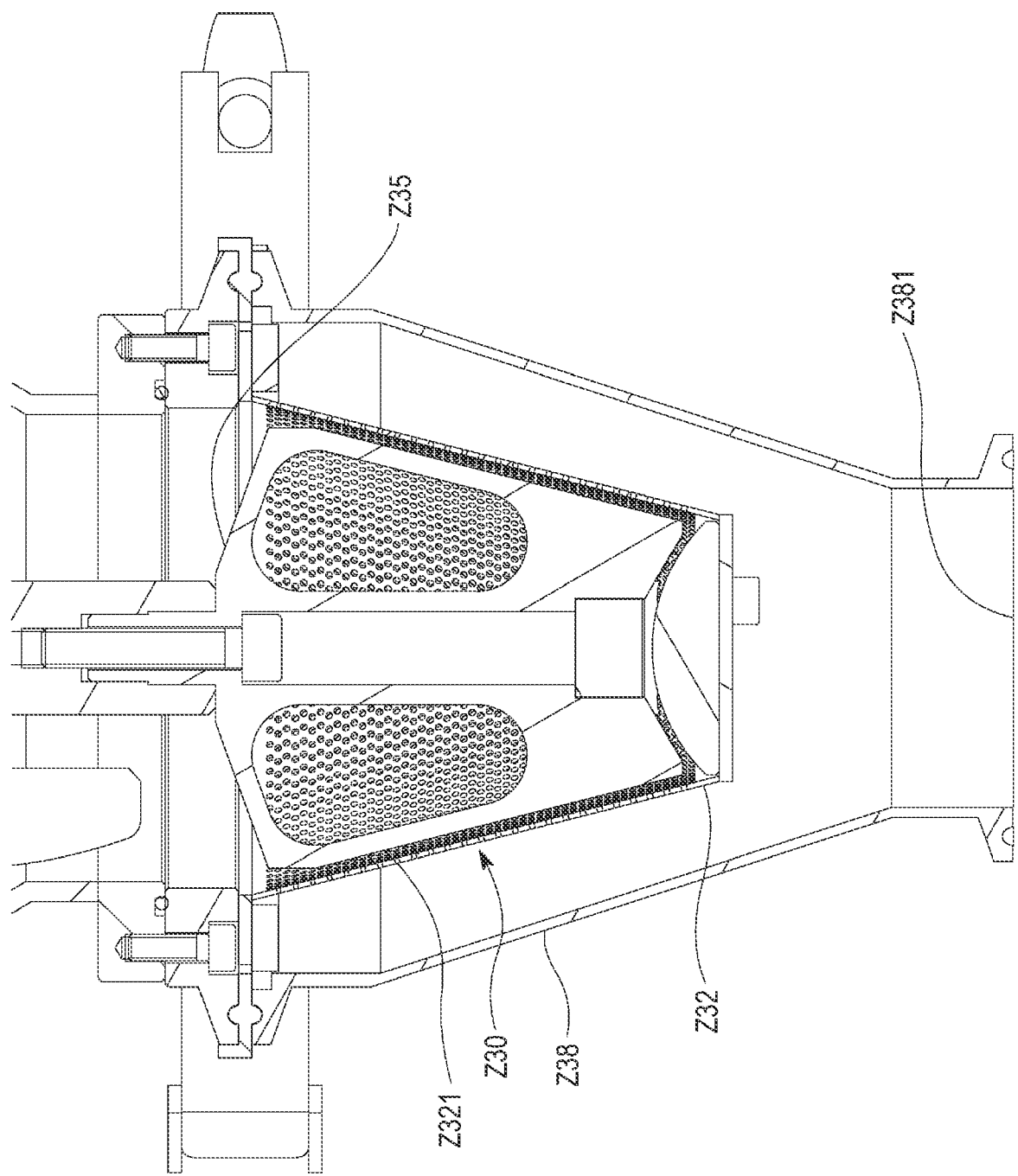
FIG. 6 is an enlarged side sectional view of a main part of the vertical mixer according to the exemplary embodiment.
Figure 7:
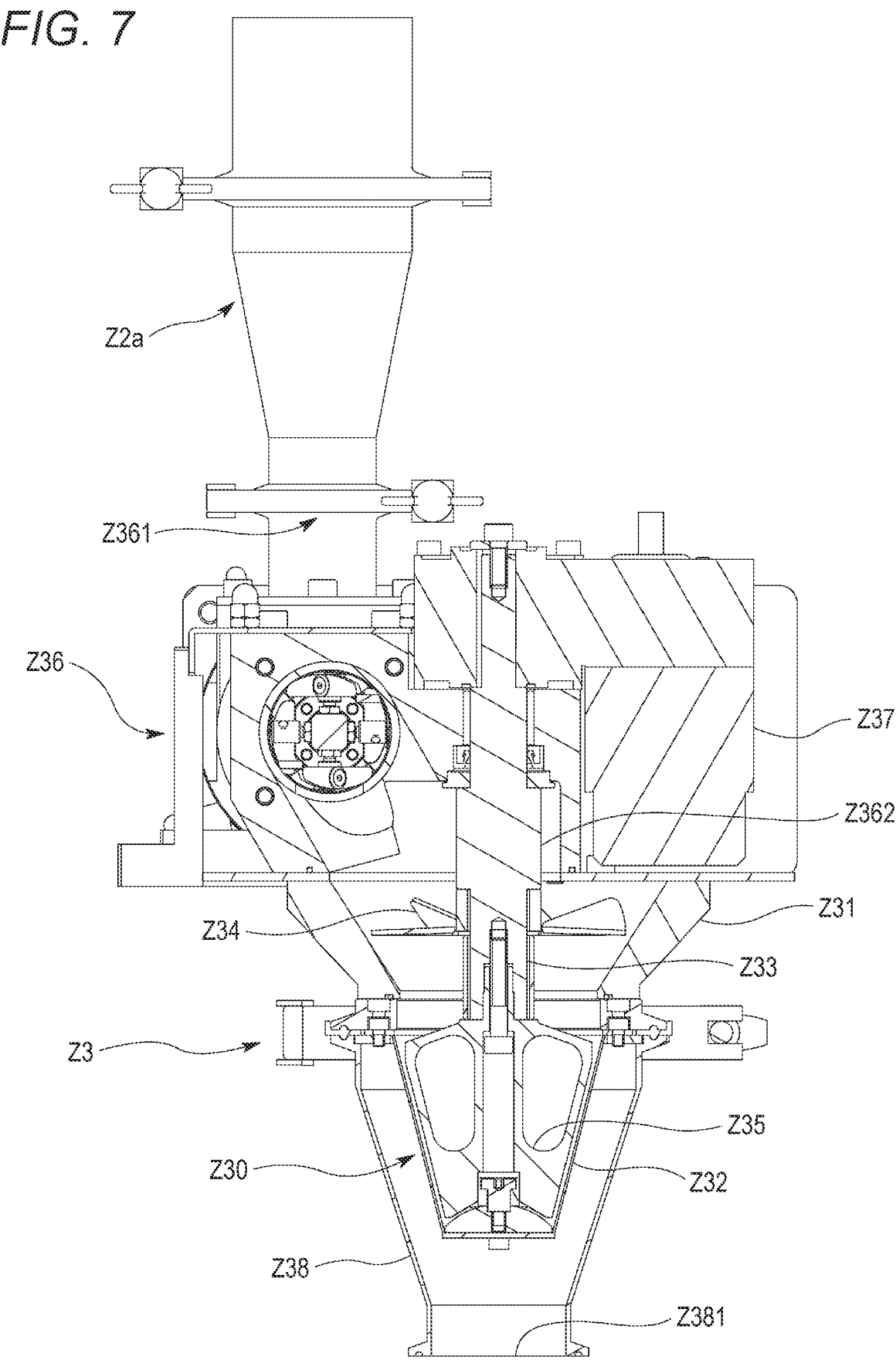
FIG. 7 is a side sectional view of another exemplary vertical mixer.

The vertical mixer Z5 functioning as the third mixer can be configured similarly to the vertical mixer Z3 shown exemplarily in FIGS. 5 to 7. The vertical mixer Z5 will thus not be described herein. The fourth connecting pipe Z2d has an upper end connected with the discharge port Z413 of the horizontal mixer Z4 and a lower end connected with the feed port of the vertical mixer Z5. The vertical mixer Z5 has an agitating rotor and an auxiliary rotor attached to an agitation shaft disposed vertically or slanted from the vertical direction. The agitating rotor and the auxiliary rotor each function as a third mixing member. The powdery materials fed to the feed port of the vertical mixer Z5 through the fourth connecting pipe Z2d are mixed by the agitating rotor and the auxiliary rotor rotating along with the agitation shaft (i.e., third mixing).

The fifth connecting pipe Z2e has an upper end connected with a discharge port of the vertical mixer Z5 and a lower end connected with the feed port Z361 of the buffer tank 19. The powdery materials mixed by the vertical mixer Z5 are fed from the discharge port of the vertical mixer Z5 to the buffer tank 19 through the fifth connecting pipe Z2e.

The buffer tank 19 has a bottom connected to the molding machine. The mixed-powdery materials passing through the buffer tank 19 are fed to the feeder X in the molding machine and are eventually compression molded in the die bores 4.

The mixing degree of the mixed-powdery materials discharged from the buffer tank 19 of the powdery-material mixing and feeding device Z toward the molding machine is thus measured at the powdery-material mixing degree measurement device M included in the powdery-material mixing and feeding device Z and each site other than the mixing degree measurement device M. If the mixing degree is out of a predetermined range, then the mixed-powdery materials are discharged, alarm sound is issued, the device is stopped, or the like. The powdery-material mixing degree measurement device M promptly measures the mixing degree of the powdery materials mixed by the powdery-material mixing and feeding device Z and operates appropriately.

Examples of a method of measuring a mixing degree of mixed-powdery materials include Raman spectroscopy, infrared spectroscopy, X-ray diffraction, X-ray transmission measurement, and high performance liquid chromatography (HPLC). Any one of these methods is applicable to promptly measure a mixing degree of mixed-powdery materials. The exemplary embodiment mainly adopts near infrared reflectance (NIR), or a near infrared absorption spectrum method. Specifically, in order to evaluate an amount or a percentage (i.e., ratio) of the principal agent in the mixed-powdery materials (i.e., uniformity of the mixed-powdery materials) (whether or not the mixed-powdery materials are segregated), the mixed-powdery materials moving from the powdery-material mixing and feeding device Z toward the feeder X of the compression-molding machine are irradiated with near infrared light to measure light absorption and reflection (scatter) for qualitative and quantitative analyses of a concentration and the like of the principal agent based on a spectrum thereof. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials.

The exemplary embodiment adopts a near infrared sensor as a process analytical technology (PAT) sensor configured to measure a mixing degree and the like of powdery materials. As shown exemplarily in FIG. 4, the configuration according to the exemplary embodiment includes a first sensor S1 of a near infrared sensor configured to initially measure the mixing degree of the mixed-powdery materials before being reserved in the buffer tank 19.

The powdery materials mixed by the powdery-material mixing and feeding device Z are temporarily reserved in the buffer tank 19 as a reservoir after the first sensor S1 measures the mixing degree of the powdery materials. The powdery materials reserved in the buffer tank 19 are fed to the powdery-material mixing degree measurement device M after a near infrared sensor S2 measures the mixing degree of the powdery materials again. The mixed-powdery materials can optionally be further agitated and mixed in the buffer tank 19.

Figure 9:
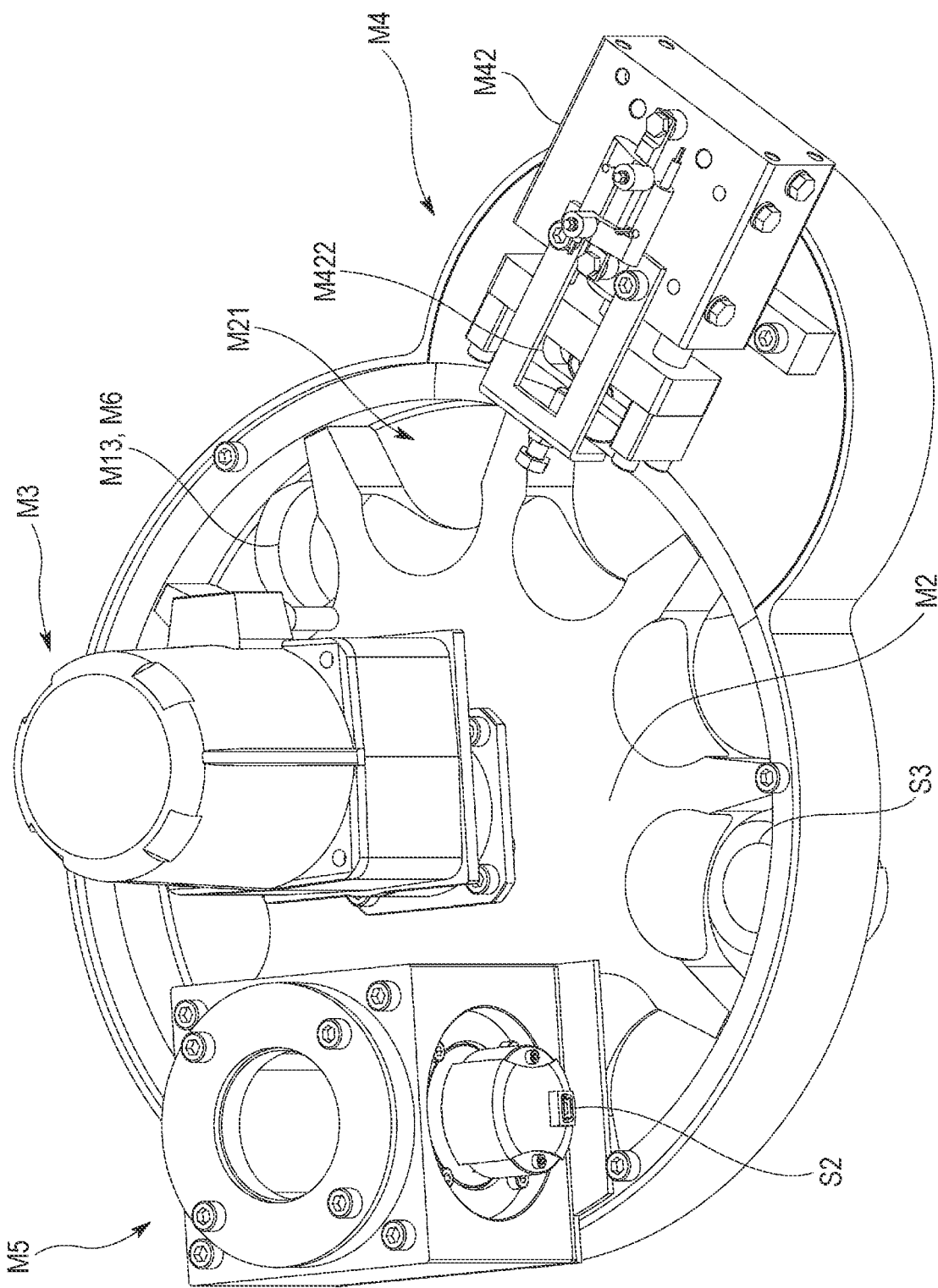
FIG. 9 is a perspective view of a main part of a powdery-material mixing degree measurement device according to the exemplary embodiment.
Figure 10:
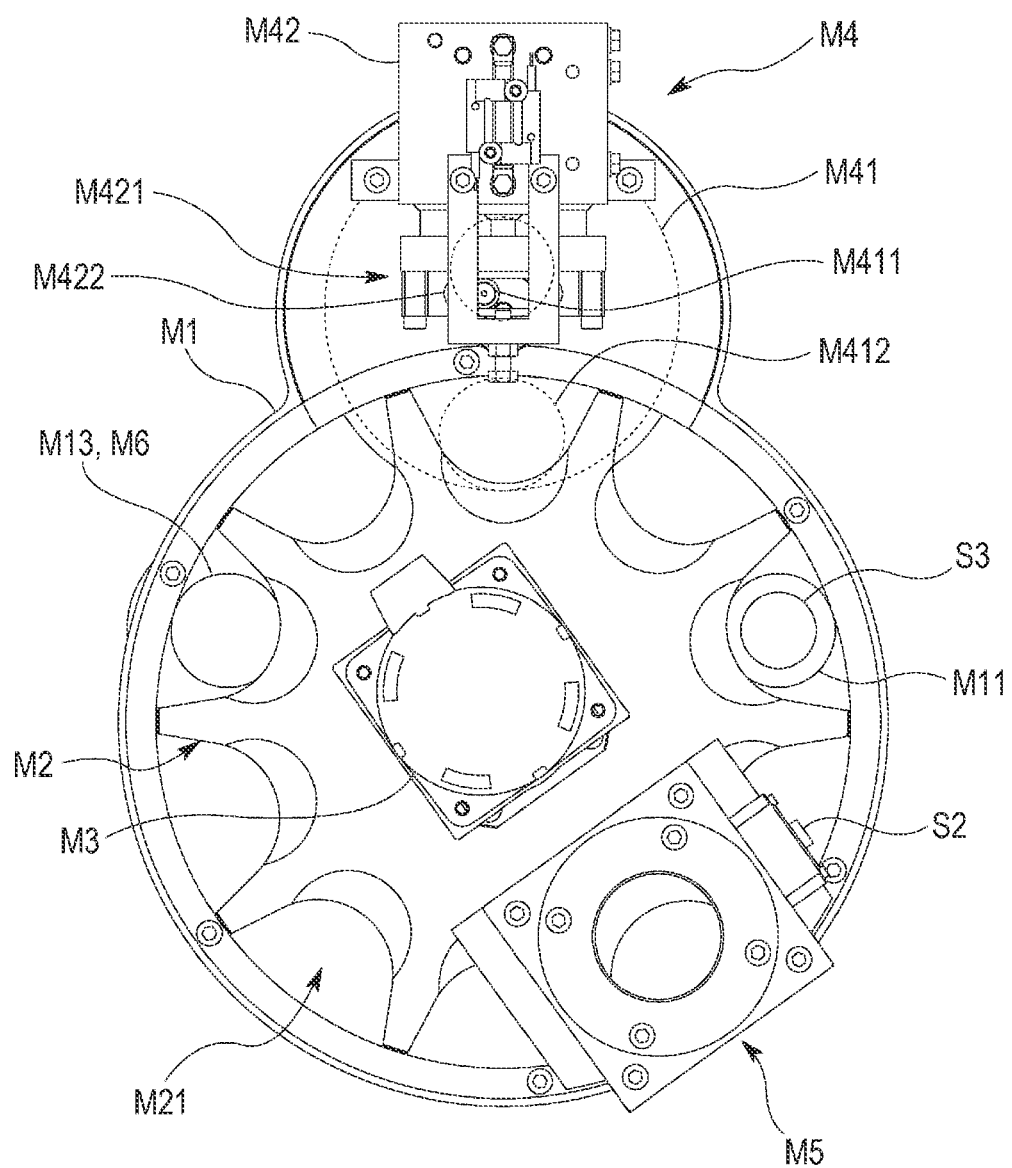
FIG. 10 is a plan view of the main part of the powdery-material mixing degree measurement device according to the exemplary embodiment.

As shown exemplarily in FIGS. 9 and 10, the powdery-material mixing degree measurement device M includes a case M1, a rotator M2 as a movable member in the case M1, a motor M3 as a driver for the rotator M2, near infrared sensors S2 and S3 configured to measure a mixing degree of powdery materials, a powdery-material remover M4 configured to remove defective mixed-powdery materials, the importing port M5 configured to introduce the mixed-powdery materials from the buffer tank 19 into the case M1, and the discharger M6 configured to discharge the mixed-powdery materials to the agitated feeder X functioning as a filling device of the molding machine.

Figure 11:
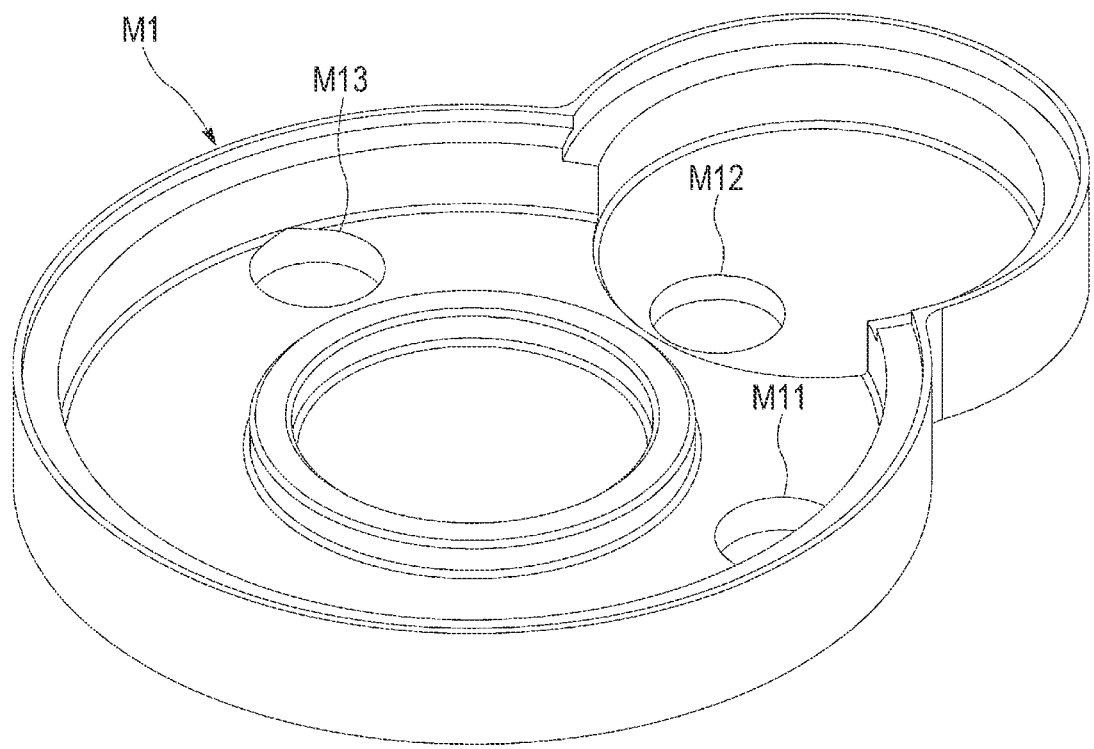
FIG. 11 is a perspective view of a case of the powdery-material mixing degree measurement device according to the exemplary embodiment.
Figure 12:
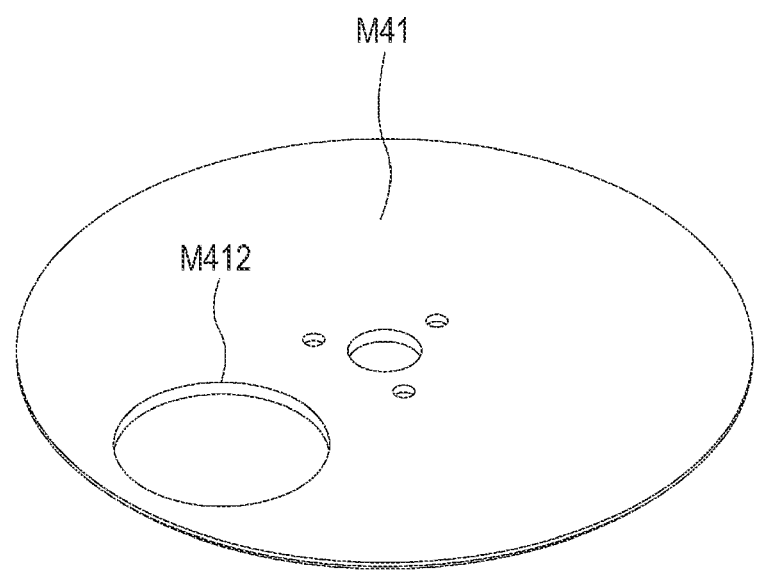
FIG. 12 is a perspective view of a drive body of the powdery-material mixing degree measurement device according to the exemplary embodiment.
Figure 13:
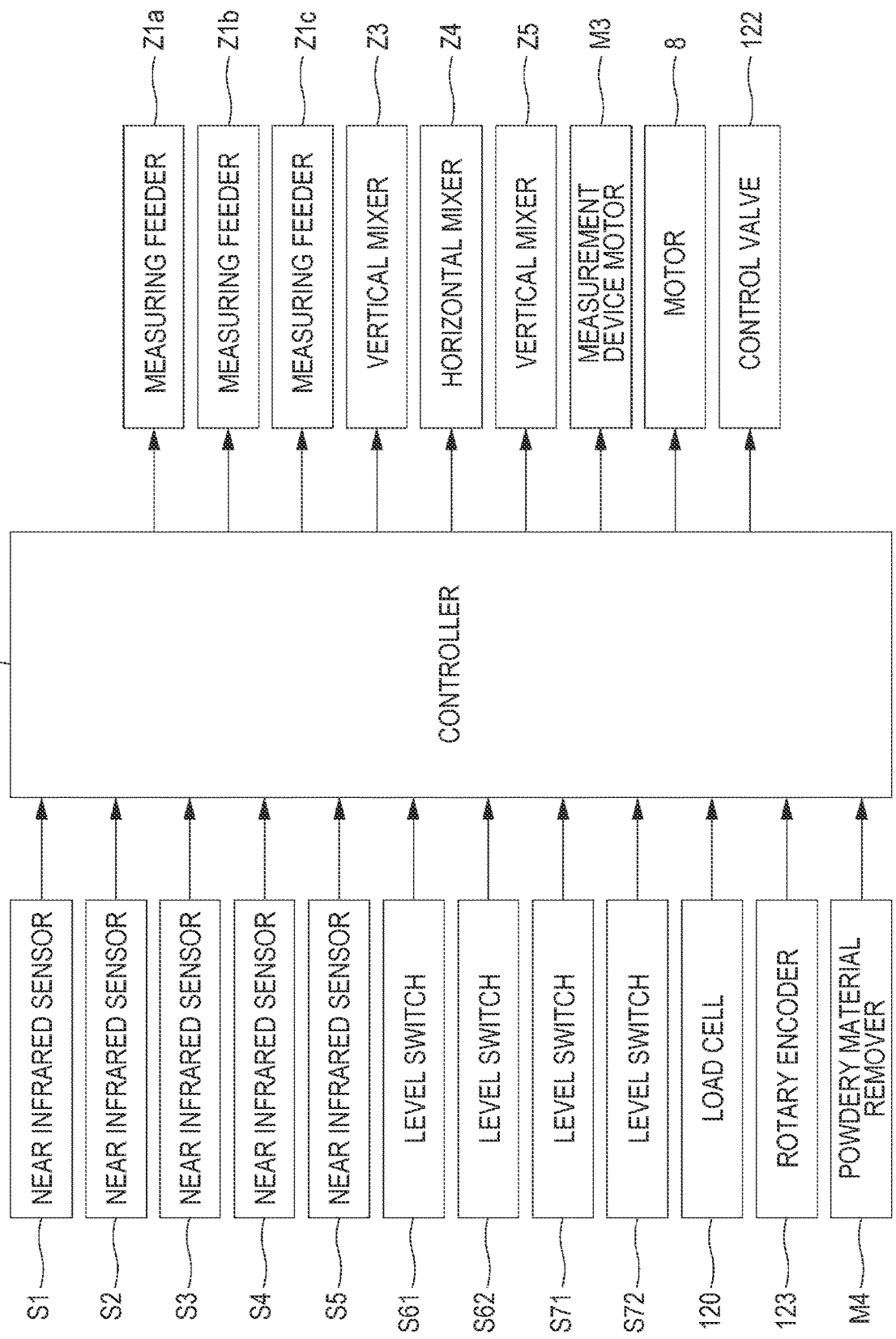
FIG. 13 is a block diagram of a control system in a compression molding system according to the exemplary embodiment.

As shown exemplarily in FIG. 11, the case M1 has a bottom surface including an attachment bore M11 allowing the near infrared sensor S3 to be mounted therein, a removal bore M12 (i.e., the powdery-material remover M4) for removal of a powdery material, and a discharge bore M13 for discharge of a powdery material to the powdery-material feeding pipe 191. The discharge bore M13 is positioned at the discharger M6. The case M1 has a top surface on which the importing port M5 configured to feed the case M1 with a powdery material is mounted. The mixed-powdery materials enter the case M1 by way of the buffer tank 19 and the importing port M5. The importing port M5 has the second sensor S2 of a near infrared sensor configured to measure a mixing degree of mixed-powdery materials passing through the importing port M5.

The rotator M2 includes a plurality of pocket-like movable portions M21. The importing port M5 feeds the movable portions M21 with the mixed-powdery materials. The rotator M2 is driven to rotate by the motor M3 positioned above the rotator M2. The mixed-powdery materials, captured by the movable portions M21, are transferred along with rotation of the rotator M2.

The third sensor S3 of a near infrared sensor is attached to the attachment bore M11 of the case M1 and is configured to measure a mixing degree of powdery materials fed to the movable portions M21 and captured by the movable portions M21. The rotator M2 may temporarily stop rotation when the third sensor S3 measures the mixing degree and the like of the powdery materials captured by the movable portions M21 (i.e., the rotator M2 rotates intermittently in some cases). When the sensors S1, S2, and S4 measure the mixing degree and the like of powdery materials actually flowing in a pipe, the sensors may have unstable measurement values. When the sensor S3 measures the powdery materials captured by the rotator M2 and the movable portions M21 not in motion as well as the powdery materials in the movable portions M21 have stabilized density, the mixing degree and the like of the powdery materials can be measured quite accurately.

The powdery-material remover M4 includes a case, a drive body M41, and a driver M42 configured to drive the drive body M41. The case of the powdery-material remover M4 is provided integrally with the case M1. The drive body M41 according to the exemplary embodiment has a circular disc shape, and includes a center projection M411 engaged with the driver M42, and a partial cutoff portion M412. The driver M42 has a distal end M421 configured to drive forward and backward along a Y axis indicated in FIG. 10, and an engagement bore M422 disposed at the distal end and engaged with the projection M411 of the drive body M41.

In a state where the distal end M421 of the driver M42 moves in a positive direction along the Y axis as indicated in FIG. 10, the cutoff portion M412 of the drive body M41 is located in the center of the removal bore M12 of the case M1. In another state where the distal end M421 moves in a negative direction along the Y axis, the cutoff portion M412 is spaced apart from the removal bore M12 of the case M1.

Specifically, in the case where the driver M42 drives to move the distal end M421 in the negative direction along the Y axis, the drive body M41 is driven clockwise together therewith and the cutoff portion M412 is not overlapped with the removal bore M12. A powdery material in the movable portions M21 of the rotator M2 is not removed in this case. In the other case where the driver M42 drives to move the distal end M421 in the positive direction along the Y axis, the drive body M41 is driven counterclockwise together therewith and the cutoff portion M412 is overlapped with the removal bore M12. The powdery material in the movable portions M21 of the rotator M2 is removed in this case.

The drive body M41 according to the exemplary embodiment is driven clockwise and counterclockwise to remove the powdery material in the movable portions M21 of the rotator M2. The drive body M41 can alternatively be configured to rotate only in one direction to remove the powdery material in the movable portions M21.

If the mixing degree of the powdery materials measured with any of the first to third sensors S1 to S3 (i.e., the amount or the percentage (i.e., ratio) of the principal agent in the mixed-powdery materials), is out of the predetermined range, then the powdery-material remover M4 removes the mixed-powdery materials in the movable portions M21. The mixed-powdery materials in the movable portions M21 can alternatively be removed if all mixing degree measurement values of the first to third sensors S1 to S3 are out of the predetermined range, or if the measurement value of any one of the sensors S is out of the predetermined range.

The powdery-material remover M4 is also configured to sample the mixed-powdery materials.

The mixed-powdery materials not removed by the powdery-material remover M4 reach the discharger M6 and pass through the discharge bore M13 to reach the powdery-material feeding pipe 191.

A fourth sensor S4 of a near infrared sensor measures the mixing degree of the mixed-powdery materials reached the powdery-material feeding pipe 191 before the mixed-powdery materials are guided into the agitated feeder X functioning as a filling device of the molding machine. Furthermore, a fifth sensor S5 of a near infrared sensor measures the mixing degree of the mixed-powdery materials in the agitated feeder X in the molding machine according to the exemplary embodiment.

If the mixing degree of the mixed-powdery materials measured by the fourth sensor S4 and/or the fifth sensor S5 is out of the predetermined range, then the mixed-powdery materials in the feeder X are once filled in each of the die bores 4 of the table 31 of the compression-molding machine and are compression molded by the upper and lower punches 5 and 6 into the shape of a molded product. The molded product is then removed by the molded product removal mechanism W before reaching the molded product collecting position 18. Specifically, in the molding machine, the control valve 122 is opened when the die bore 4 filled with defective mixed-powdery materials tableted into a molded product passes by the air spray nozzle 16a, and the air spray nozzle 16a sprays air to blow the molded product out of the table 31.

In summary, the powdery-material remover M4 removes the mixed-powdery materials if any of the first to third sensors S1 to S3 detests a mixing degree of the mixed-powdery materials out of the predetermined range, and the molded product removal mechanism W removes the compression molded mixed-powdery materials if the fourth sensor S4 and/or the fifth sensor S5 detects a mixing degree of the mixed-powdery materials out of the predetermined range.

The molded-product removal mechanism W removes a molded product compression molded in any of the die bores 4 also in a case where any of the load cells 120 mounted to the molding machine detects that compression pressure applied to the powdery material compressed in the die bore 4 is out of a predetermined range.

Summarized again below is a flow of continuous production of compression molded products by the compression-molding system according to the exemplary embodiment. Initially, the first measuring feeder Z1a simultaneously measures and feeds the principal agent, and the second measuring feeder Z1b simultaneously measures and feeds the excipient or the like (i.e., measuring and feeding). The vertical mixer Z3 functioning as the first mixer is subsequently fed with the powdery materials of the principal agent and the excipient or the like and mixes the powdery materials therein (i.e., first mixing). In the vertical mixer Z3, the agitating rotor Z34 rotates about the agitation shaft Z33 disposed substantially vertically, to mix the powdery materials of the principal agent and the excipient or the like.

The horizontal mixer Z4 functioning as the second mixer is fed with the mixed-powdery materials of the principal agent and the excipient or the like subjected to the first mixing and mixes the powdery materials again (i.e., second mixing). In the horizontal mixer Z4, the agitating rotor Z44 rotates about the agitation shaft Z42 disposed substantially horizontally, to mix the powdery materials of the principal agent and the excipient or the like. Such a process achieves improvement in mixing degree of the at least two types of powdery materials (e.g., the principal agent and the excipient or the like), and causes less segregation of the principal agent.

The first mixing preferably includes reserving at least part of the powdery materials. Specifically, the powdery materials pass through the plurality of bores Z321 of the powdery-material passing member Z32. The reservoir Z30 reserves powdery materials by increase in an amount of the powdery materials to be fed to the first vertical mixer Z3a to be more than the powdery materials passing through the bores Z321 or increase in rotational speed of the auxiliary rotor Z35. The powdery materials then pass through the bores Z321 while being agitated and mixed by the auxiliary rotor Z35.

Furthermore, the third measuring feeder Z1c simultaneously measures and feeds the lubricant (i.e., lubricant feeding). The lubricant is fed to the horizontal mixer Z4 in the exemplary embodiment, but can alternatively be fed to a second vertical mixer Z3b, the feeder X, or the like, with no limitation in feeding destination of the lubricant to the horizontal mixer Z4. The lubricant can be fed by the μR feeder (e.g., manufactured by Nisshin Engineering Inc.) or by an atomizer (i.e., spray device).

Furthermore, the powdery materials are fed to the vertical mixer Z5 so as to be mixed after the second mixing by the horizontal mixer Z4 (i.e., third mixing), for further improvement in mixing degree of the powdery materials.

The mixed-powdery materials including the principal agent, the excipient or the like, and the lubricant are fed to the buffer tank 19 of the compression-molding machine. The sensors S2 or S3 in the powdery-material mixing degree measurement device M then measures the mixing degree of the mixed-powdery materials fed to the buffer tank 19 (measuring). Obviously, the sensor S1 can measure the mixing degree of the mixed-powdery materials before the mixed-powdery materials are fed to the buffer tank 19.

The mixed-powdery materials are removed at the powdery-material mixing degree measurement device M if the measured mixing degree of the mixed-powdery materials is out of the predetermined range (i.e., removing). The mixed-powdery materials are subsequently fed to the feeder X functioning as a filling device. The sensor S5 can measure the mixing degree of the mixed-powdery materials in the feeder X, or the sensor S4 can measure the mixing degree of the mixed-powdery materials immediately before the mixed-powdery materials are fed to the feeder X.

The mixed-powdery materials fed to the feeder X are filled in the die bore 4 of the table 31 of the turret 3 in the molding machine (i.e., filling). The mixed-powdery materials filled in each of the die bores 4 are compression molded by the upper and lower punches 5 and 6 (i.e., compression molding). The mixed-powdery materials thus compression molded into a molded product are guided by the guide member 17 and are collected at the molded-product collecting position 18. The controller C of the rotary compression-molding machine according to the exemplary embodiment causes the fourth sensor S4 and/or the fifth sensor S5 to repeatedly measure the mixing degree of the mixed-powdery materials fed by the powdery-material mixing and feeding device Z to the feeder X and filled in the die bores 4. If the measured mixing degree of the mixed-powdery materials is out of the predetermined range, then the molded product removal mechanism W in the compression-molding machine removes a defective molded product compression molded in the die bore 4 filled with the mixed-powdery materials (i.e., molded product removing).

The controller C further causes the load cells 120 to measure a compression pressure applied from the punches 5 and 6 to the powdery material in each of the die bores 4 to obtain a molded product. The controller C causes the molded product removal mechanism W to remove a defective molded product compression molded in the die bore 4 having a compression pressure out of the predetermined range (i.e., molded product removing). If a powdery material filled in the die bore 4 is more than an appropriate amount, then the compression pressure measured by the load cell 120 exceeds the predetermined range. In contrast, if the powdery material filled in the die bore 4 is less than the appropriate amount, then the compression pressure measured by the load cell 120 is less than the predetermined range. In either one of the cases, the molded product compression molded in the die bore 4 has weight, density, and hardness different from desired values and is regarded as defective.

When the die bore 4 assumed to be filled with such defective mixed-powdery materials having a mixing degree out of the predetermined range or the die bore 4 receiving compression pressure out of the predetermined range (i.e., the possibly defective molded product), passes by the air spray nozzle 16a is found by referring to an output signal from the rotary encoder 123.

Prior to filling the die bores 4 with the powdery materials in the compression-molding machine, the lubricant (i.e., external lubricant) can optionally be sprayed to the lower end surface of the upper punch 5, the upper end surface of the lower punch 6, and the inner circumferential surface of the die bore 4 (i.e., lubricant feeding).

The first measuring feeder Z1a is configured to feedback control weight (a flow rate) of the fed principal agent per unit time, the second measuring feeder Z1b is configured to feedback control weight of the fed excipient or the like per unit time, and the third measuring feeder Z1c is configured to feedback control weight of the fed lubricant per unit time. Furthermore, these powdery materials are to be mixed at a desired mixture ratio. Even in this configuration, the amounts of the powdery materials discharged from the measuring feeders Z1 and fed to the mixers Z3 and Z4 can somehow deviate from initial target amounts. The powdery material fed from any of the measuring feeders Z1 to the mixer Z3 or Z4 is sometimes smaller than the target amount. In such a case, the amount of the principal agent in the mixed-powdery materials has a ratio larger or smaller than the desired ratio. A molded product obtained by compression molding such mixed-powdery materials is defective and will fail to exert an expected drug effect.

Even if the mixer Z3 or Z4 fails to adequately mix the powdery materials and the mixed-powdery materials fed to the feeder X of the compression-molding machine have segregation of the principal agent or the excipient, molded products will be defective with different contents.

The controller C in the compression-molding system according to the exemplary embodiment adjusts, in accordance with the mixing degree measurement value of the mixed-powdery materials by any of the first to fifth sensors S1 to S5, the amounts of the powdery materials fed by the measuring feeders Z1a to Z1c, rotational speed of each of the agitation shaft Z33, the agitating rotor Z34, and the auxiliary rotor Z35 of the vertical mixer Z3, rotational speed of each of the agitation shaft Z42 and the agitating rotor Z44 of the horizontal mixer Z4, and rotational speed of the agitation shaft and the agitating rotor of the vertical mixer Z5. Examples of the controller C include a microcomputer system including a processor, a memory, an auxiliary storage device, an input/output interface, a programmable controller, a general-purpose personal computer, and a work station.

In a case where the absolute value of a difference between a target value and the amount or the percentage of the principal agent in the mixed-powdery materials repeatedly measured by any of the first to fifth sensors S1 to S5 is more than a predetermined threshold (i.e. the percentage of the principal agent is inappropriately small or large) continuously for at least a certain period, at least one of the first to third measuring feeders Z1a to Z1c is regarded as failing to feed an appropriate amount of the powdery materials.

In this case, the controller C temporarily interrupts weight feedback control by the measuring feeder Z1 itself and adjusts a rotational speed of a drive motor of each of the measuring feeders Z1 such that the amount or the percentage of the principal agent in the mixed-powdery materials measured by any of the first to fifth sensors S1 to S5 is approximate to the target value.

In a case where the measured amount or the measured percentage of the principal agent in the mixed-powdery materials is less than the target value, the first measuring feeder Z1a increases the amount of the discharged principal agent, and/or the second measuring feeder Z1b decreases the amount of the discharged excipient or the like and the third measuring feeder Z1c decreases the amount of the discharged lubricant. In another case where the measured amount or the measured percentage of the principal agent in the mixed-powdery materials is more than the target value, the first measuring feeder Z1a decreases the amount of the discharged principal agent, and/or the second measuring feeder Z1b increases the amount of the discharged excipient or the like and the third measuring feeder Z1c increases the amount of the discharged lubricant.

Alternatively, if the absolute value of the difference between the target value and the amount or the percentage of the principal agent in the mixed-powdery materials is more than the threshold continuously for at least a certain period, then the target value of the discharged amount of the powdery materials commanded by the controller C to the measuring feeders Z1a to Z1c can be changed to optimize the amount of the fed principal agent. In a case where the measured amount or the measured percentage of the principal agent in the mixed-powdery materials is less than the target value, the first measuring feeder Z1a has a higher target value of the amount of the discharged principal agent, and/or the second measuring feeder Z1b has a lower target value of the amount of the discharged excipient or the like and the third measuring feeder Z1c has a lower target value of the amount of the discharged lubricant. In another case where the measured amount or the measured percentage of the principal agent in the mixed-powdery materials is more than the target value, the first measuring feeder Z1a has a lower target value of the amount of the discharged principal agent, and/or the second measuring feeder Z1b has a higher target value of the amount of the discharged excipient or the like and the third measuring feeder Z1c has a higher target value of the amount of the discharged lubricant.

In a case where the absolute value of the difference between the target value and the amount or the percentage of the principal agent in the mixed-powdery materials repeatedly measured by any of the first to fifth sensors S1 to S5 is more than the threshold not continuously for at least a certain period but is more than the threshold instantaneously or only for a short period, (the principal agent, the excipient or the like, or the lubricant of) the mixed-powdery materials moving toward the feeder X in the molding machine is regarded as having segregation (i.e. locally having portions of high and low concentrations of the principal agent). In this case, the controller C changes (i.e., increases or decreases) a current rotational speed of the agitation shaft Z33 and the agitating rotors Z34 and Z35 of the vertical mixer Z3, changes (i.e., increases or decreases) a current rotational speed of the agitation shaft Z42 and the agitating rotor Z44 of the horizontal mixer Z4, and/or changes (i.e., increases or decreases) current rotational speed of the agitation shaft and the agitating rotor of the vertical mixer Z5, to further improve the mixing degree of the powdery materials.

Also, in the case where the absolute value of the difference between the target value and the amount or the percentage of the principal agent in the mixed-powdery materials is more than the threshold continuously for at least the certain period, the controller C can control to change current rotational speed of the agitating rotors Z34 and Z35 of the vertical mixer Z3, to change current rotational speed of the agitating rotor Z44 of the horizontal mixer Z4, and/or to change current rotational speed of the agitating rotor of the vertical mixer Z5.

As described above, increasing or decreasing each of the amounts of the powdery materials discharged from the measuring feeders Z1a to Z1c or changing rotational speed of the agitation shaft Z33 or Z42 of each of the mixers Z3 to Z5 can possibly vary the flow rate per unit time of the powdery materials passing the buffer tank 19 or the importing port M5 functioning as the supplier configured to feed the powdery-material mixing degree measurement device M with the mixed-powdery materials.

If the rotator M2 of the powdery-material mixing degree measurement device M is kept rotating at a constant rotational speed despite change in flow rate of the mixed-powdery materials in the buffer tank 19 or the importing port M5, then the mixed-powdery materials accumulated in the buffer tank 19 or the importing port M5 have an upper surface L1 varied in level because the mixed-powdery materials are captured and transferred by the movable portions M21 of the rotator M2 and the mixed-powdery materials passing through the powdery-material mixing degree measurement device M are thus not changed in amount per unit time. The upper surface L1 of the powdery materials in the buffer tank 19 or the importing port M5 increases in level in a case where the powdery materials fed to the movable portions M21 of the rotator M2 are larger in flow rate per unit time than the powdery materials transferred by the powdery-material mixing degree measurement device M. The upper surface L1 of the powdery materials in the buffer tank 19 or the importing port M5 decreases in level in another case where the powdery materials fed to the movable portions M21 of the rotator M2 are larger in flow rate per unit time than the powdery materials transferred by the powdery-material mixing degree measurement device M.

When the upper surface L1 of the powdery materials significantly increases or decreases in level in the buffer tank 19 disposed above and directly connected to the powdery-material mixing degree measurement device M or the importing port M5, the powdery materials fed to the movable portions M21 of the rotator M2 increase or decrease from the appropriate amount, and the powdery materials captured in the movable portions M21 (i.e., the powdery materials to be measured by the sensor S3 are varied in density). This may lead to deteriorated accuracy in measurement of the properties of the powdery materials by the sensor S3.

In order to inhibit such a variation in the amount or density of the fed powdery materials, the controller C according to the exemplary embodiment causes a sensor S6 to obtain the level of the upper surface L1 of the mixed-powdery materials in the buffer tank 19 or the importing port M5 and adjusts rotational speed of the motor M3, eventually the rotator M2, of the powdery-material mixing degree measurement device M in accordance with the level of the upper surface.

Figure 16:
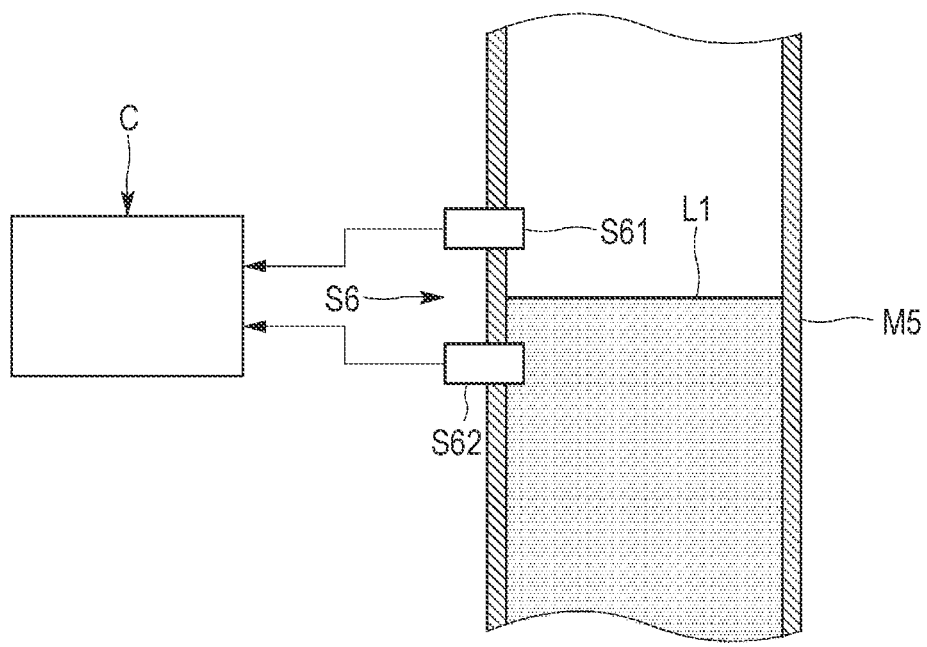
FIG. 16 is a side sectional view of a supplier in the powdery-material mixing degree measurement device according to the exemplary embodiment.

As shown exemplarily in FIG. 16, the buffer tank 19 or the importing port M5 has two capacitance level switches S61 and S62 each functioning as the sensor S6. The level switches S61 and S62 are configured to detect whether the level of the upper surface L1 of a powdery material accumulated in the buffer tank 19 or the importing port M5 is higher or lower than the level switches S61 and S62, respectively. The controller C is configured to determine, with use of the level switches S61 and S62, whether the level of the upper surface L1 of the powdery material in the buffer tank 19 or the importing port M5 is above the upper level switch S61, is below the upper level switch S61 and above the lower level switch S62, or is below the lower level switch S62. When the level of the upper surface L1 of the powdery material in the buffer tank 19 or the importing port M5 is below the upper level switch S61 and above the lower level switch S62, the upper surface level of the powdery material is regarded as being within a desired target range.

In a case where the upper surface level of the buffer tank 19 or the importing port M5 is not lower than the upper limit of the target range (i.e., when the upper surface level is not lower than the upper level switch S61), the controller C according to the exemplary embodiment increases rotational speed of the rotator M2 of the powdery-material mixing degree measurement device M in comparison to a case where the upper surface level is within the target range. This leads to increase in a flow rate per unit time of the powdery materials transferred by the powdery-material mixing degree measurement device M and decrease in a level of the upper surface of the powdery materials in the buffer tank 19 or the importing port M5 to be within the target range.

In another case where the upper surface level of the powdery material in the buffer tank 19 or the importing port M5 is not higher than the lower limit of the target range (i.e., when the upper surface level is not higher than the lower level switch S62), the controller C decreases rotational speed of the rotator M2 in comparison to the case where the upper surface level is within the target range. This leads to decrease in the flow rate per unit time of the powdery materials transferred by the powdery-material mixing degree measurement device M and increase in the level of the upper surface of the powdery materials in the buffer tank 19 or the importing port M5 to be within the target range.

When the rotational speed of the rotator M2 is controlled, a period of increase in the rotational speed while the upper surface level of the powdery material in the buffer tank 19 or the importing port M5 decreases from the upper limit toward the lower limit in the target range, and a period of decrease in the rotational speed while the upper surface level of the powdery material in the buffer tank 19 or the importing port M5 increases from the lower limit toward the upper limit in the target range, can repeat alternately.

Figure 18:
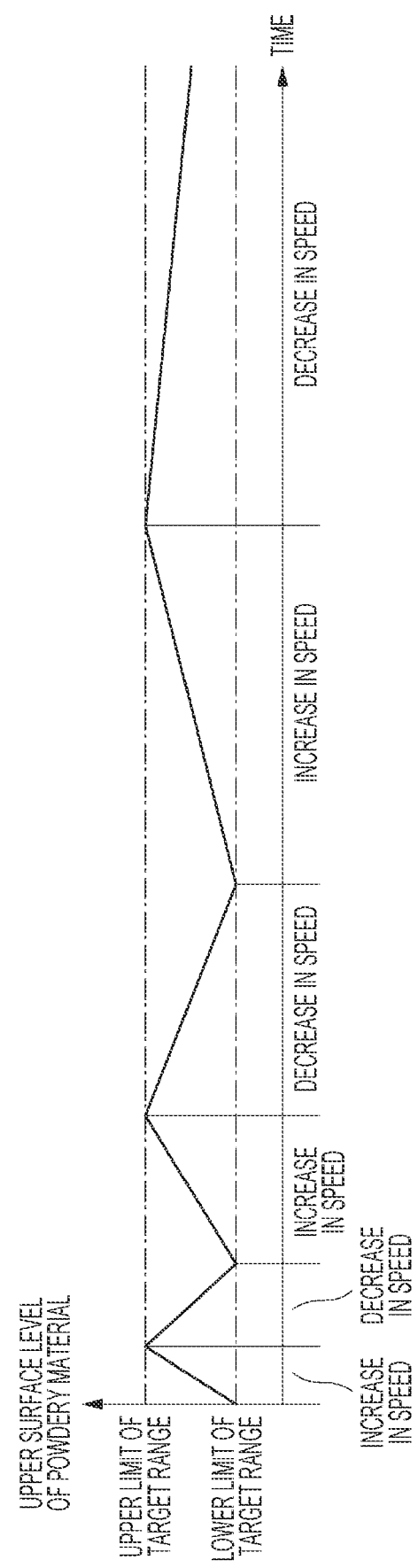
FIG. 18 is a timing chart indicating a pattern of control conducted by the control system in the compression-molding system according to the exemplary embodiment.

As indicated in FIG. 18, the controller C according to the exemplary embodiment controls, under such a condition, the rotational speed of the rotator M2 in a first period of increase in speed and a subsequent second period of increase in speed such that the second period is longer than the first period. For example, the rotational speed of the rotator M2 in the subsequent second period of increase in speed is made lower than the rotational speed of the rotator M2 in the first period of increase in speed.

The controller C also controls the rotational speed of the rotator M2 in a first period of decrease in speed and a subsequent second period of decrease in speed such that the second period is longer than the first period. For example, the rotational speed of the rotator M2 in the subsequent second period of increase in speed is made higher than the rotational speed of the rotator M2 in the first period of increase in speed. Such control eventually allows the upper surface level of the powdery material in the buffer tank 19 or the importing port M5 to stably be kept without reaching the upper limit or the lower limit of the target range.

As described above, increasing or decreasing each of the amounts of the powdery materials discharged from the measuring feeders Z1a to Z1c, changing rotational speed of the agitation shaft Z33 or Z42 of each of the mixers Z3 to Z5, or changing rotational speed of the rotator M2 in the powdery-material mixing degree measurement device M can possibly vary the flow rate per unit time of the powdery materials passing the powdery-material feeding pipe 191 provided to feed the feeder X of the molding machine with the mixed-powdery materials.

If the turret 3 and the punches 5 and 6 of the molding machine are kept rotating at a constant rotational speed despite change in the flow rate of the mixed-powdery materials toward the powdery-material feeding pipe 191, then the mixed-powdery materials accumulated in the powdery-material feeding pipe 191 have an upper surface L2 varied in the level because the molding machine uses a constant amount of the mixed-powdery materials per unit time. The level of the upper surface L2 of the powdery material in the powdery-material feeding pipe 191 increases in a case where the powdery material fed to the powdery-material feeding pipe 191 has a flow rate per unit time more than the amount of the powdery material used by the molding machine per unit time. The level of the upper surface L2 of the powdery material in the powdery-material feeding pipe 191 decreases in another case where the powdery material fed to the powdery-material feeding pipe 191 has a flow rate per unit time less than the amount of the powdery material used by the molding machine per unit time.

Large variation in the level of the upper surface L2 of the powdery material in the powdery-material feeding pipe 191, disposed above and directly connected to the feeder X, will lead to increase or decrease from the appropriate amount of the powdery material filled into the die bores 4 from the feeder X and defectiveness of the product molded in the die bores 4.

In order to inhibit such a variation in the amount of the filled powdery material, the controller C according to the exemplary embodiment causes a sensor S7 to obtain the level of the upper surface L2 of the mixed-powdery materials in the powdery-material feeding pipe 191 and adjusts rotational speed of the motor 8, eventually the turret 3 and the punches 5 and 6 of the molding machine in accordance with the level of the upper surface.

Figure 17:
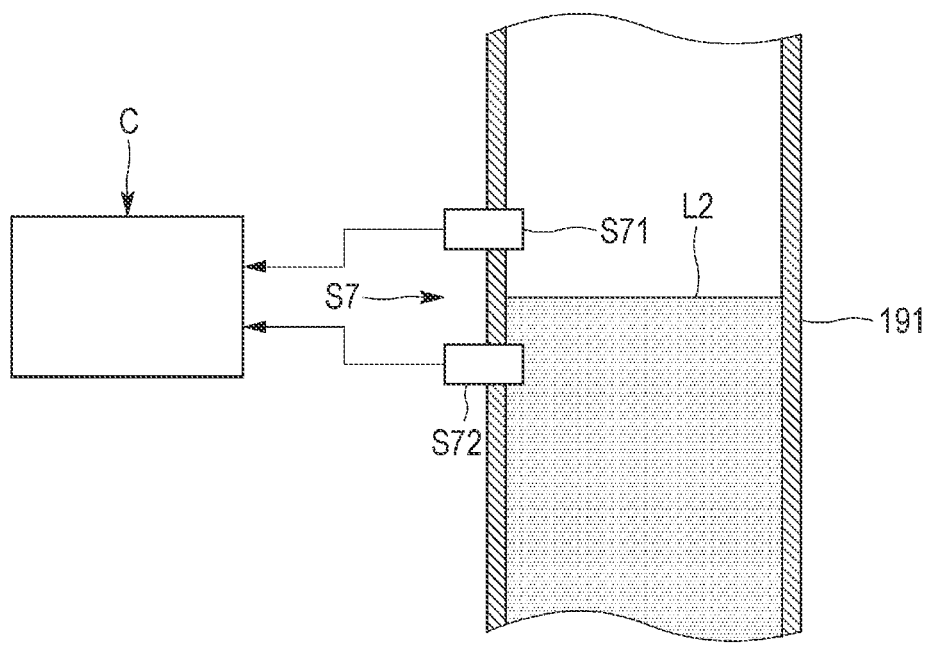
FIG. 17 is a side sectional view of a feeding pipe of the powdery-material mixing and feeding device according to the exemplary embodiment.

As shown exemplarily in FIG. 17, the powdery-material feeding pipe 191 has two capacitance level switches S71 and S72 each functioning as the sensor S7. The level switches S71 and S72 are configured to detect whether the level of the upper surface L2 of a powdery material accumulated in the powdery-material feeding pipe 191 is higher or lower than the level switches S71 and S72, respectively. The controller C is configured to determine, with use of the level switches S71 and S72, whether the level of the upper surface L2 of the powdery material in the feeding pipe 191 is above the upper level switch S71, is below the upper level switch S71 and above the lower level switch S72, or is below the lower level switch S72. When the level of the upper surface L2 of the powdery material in the feeding pipe 191 is below the upper level switch S71 and above the lower level switch S72, the upper surface level of the powdery material is regarded as being within a desired target range.

In a case where the upper surface level of the powdery material in the powdery-material feeding pipe 191 is not lower than the upper limit of the target range (i.e., when the upper surface level is not lower than the upper level switch S71), the controller C according to the exemplary embodiment increases the rotational speed of the turret 3 as well as the punches 5 and 6 of the molding machine in comparison to a case where the upper surface level is within the target range. This leads to increase in the amount of the powdery material used by the molding machine per unit time and decrease in level of the upper surface of the powdery material in the powdery-material feeding pipe 191 to be within the target range.

In another case where the upper surface level of the powdery material in the powdery-material feeding pipe 191 is not higher than the lower limit of the target range (i.e., when the upper surface level is not higher than the lower level switch S71), the controller C decreases the rotational speed of the turret 3, as well as the punches 5 and 6 of the molding machine, in comparison to the case where the upper surface level is within the target range. This leads to decrease in the amount of the powdery material used by the molding machine per unit time and increase in level of the upper surface of the powdery material in the powdery-material feeding pipe 191 to be within the target range.

When the rotational speed of the turret 3 and the punches 5 and 6 of the molding machine is controlled, a period of increase in the rotational speed while the upper surface level of the powdery material in the powdery-material feeding pipe 191 decreases from the upper limit toward the lower limit in the target range, and a period of decrease in the rotational speed while the upper surface level of the powdery material in the feeding pipe 191 increases from the lower limit toward the upper limit in the target range, can repeat alternately.

As indicated in FIG. 18, the controller C according to the exemplary embodiment controls, under such a condition, a rotational speed of the turret 3 and the punches 5 and 6 in a first period of increase in speed and a subsequent second period of increase in speed such that the second period is longer than the first period. For example, the rotational speed of the turret 3 and the punches 5 and 6 in the subsequent second period of increase in speed is made lower than the rotational speed of the turret 3 and the punches 5 and 6 in the first period of increase in speed.

The controller C also controls the rotational speed of the turret 3 and the punches 5 and 6 in a first period of decrease in speed and a subsequent second period of decrease in speed such that the second period is longer than the first period. For example, the rotational speed of the turret 3 and the punches 5 and 6 in the subsequent second period of increase in speed is made higher than the rotational speed of the turret 3 and the punches 5 and 6 in the first period of increase in speed. Such control eventually allows the upper surface level of the powdery material in the powdery-material feeding pipe 191 to stably be kept without reaching the upper limit or the lower limit of the target range.

As already described, the powdery-material remover M4 of the powdery-material mixing and feeding device Z configured to deliver a powdery material toward the powdery-material feeding pipe 191 occasionally removes any defective powdery material without feeding to the powdery-material feeding pipe 191. Removal of such a powdery material by the powdery-material remover M4 leads to decrease in an amount of the powdery material delivered toward the powdery-material feeding pipe 191 per unit time, so that the upper surface level of the powdery material in the powdery-material feeding pipe 191 may be decreased.

In a case where the powdery-material remover M4 removes the powdery material even though the upper surface level of the powdery material is below the upper level switch S71 and above the lower level switch S72, the controller C according to the exemplary embodiment conducts feedforward control of decreasing the rotational speed of the turret 3 and the punches 5 and 6 of the molding machine in comparison to the contrast case. Specifically, when the controller C receives a signal indicating that the driver M42 in the powdery-material remover M4 operates and the powdery material captured by the movable portions M21 of the rotator M2 is dropped into the removal bore M12, the controller C decreases a current rotational speed of the turret 3 and the punches 5 and 6. Assume that the rotational speed of the turret 3 and the punches 5 and 6 has a value obtained by multiplying the rotational speed immediately before the decrease in speed and a coefficient (i.e., larger than zero) smaller than one.

When the controller C controls to decrease the rotational speed of the turret 3 and the punches 5 and 6 of the molding machine in response to removal of the powdery material by the powdery-material remover M4, the rotational speed is decreased preferably at a rate according to the rotational speed immediately before the decrease in speed.

In a case where the turret 3 and the punches 5 and 6 immediately before the decrease in speed have a relatively high rotational speed, the powdery-material mixing and feeding device Z feeds the powdery-material feeding pipe 191 and eventually the feeder X with the powdery material originally having a large flow rate per unit time. Meanwhile, the powdery-material remover M4 removes, at one time, the powdery material having a fundamentally constant amount equal to that of the powdery material captured by one of the movable portions M21 of the rotator M2. Accordingly, if the powdery material is removed while the turret 3 and the punches 5 and 6 have a relatively high rotational speed, then the powdery-material mixing and feeding device Z feeds the powdery-material feeding pipe 191 with the powdery material having a small decrease rate per unit time and such removal has a relatively small influence. The rotational speed of the turret 3 and the punches 5 and 6 of the molding machine can have a small decrease rate upon removal of the powdery material, so that the coefficient multiplied by the rotational speed immediately before the decrease in the speed is set to have a larger value.

In another case where the turret 3 and the punches 5 and 6 have a relatively low rotational speed immediately before the decrease in speed, the powdery-material mixing and feeding device Z feeds the powdery-material feeding pipe 191 with the powdery material originally having a small flow rate per unit time. Meanwhile, the powdery-material remover M4 removes, at one time, the powdery material having a fundamentally constant amount. If the powdery material is removed while the turret 3 and the punches 5 and 6 have a relatively low rotational speed, then the powdery-material mixing and feeding device Z feeds the powdery-material feeding pipe 191 with the powdery material having a large decrease rate per unit time and such a removal has a relatively large influence. The rotational speed of the turret 3 and the punches 5 and 6 of the molding machine thus needs to have a large decrease rate upon removal of the powdery material, so that the coefficient multiplied by the rotational speed immediately before the decrease in speed is set to have a smaller value.

The exemplary embodiment provides a powdery-material mixing degree measurement device M configured to measure a mixing degree of mixed-powdery materials containing at least two types of powdery materials and subsequently deliver the mixed-powdery materials toward a compression-molding machine configured to compression mold the mixed-powdery materials. The powdery-material mixing degree measurement device includes a supplier (e.g., a buffer tank 19 or an importing port M5) configured to be fed with the mixed-powdery materials, a discharger M6 configured to discharge to feed, with the mixed-powdery materials, a filling device X configured to fill a die bore 4 of the compression-molding machine with a powdery material, a rotator M2 including a plurality of movable portions M21 configured to capture the mixed-powdery materials fed through the supplier 19 or M5 and transfer the mixed-powdery materials to the discharger M6, a sensor S3 configured to measure a mixing degree of the mixed-powdery materials captured by the movable portions M21 of the rotator M2, a sensor S6 configured to detect whether or not the mixed-powdery materials in the supplier 19 or M5 has an upper surface level kept within a constant target range, and a controller C configured to adjust a rotational speed of the rotator M2 such that the upper surface level of the powdery materials in the supplier 19 or M5 is kept within the constant target range.

Specifically, the rotational speed of the rotator M2 is increased when the upper surface level of the powdery materials in the supplier 19 or M5 is equal to or more than an upper limit of the target range in comparison to a contrast case, and the rotational speed of the rotator M2 is decreased when the upper surface level of the powdery materials in the supplier 19 or M5 is equal to or less than a lower limit of the target range in comparison to a contrast case.

Increase in the rotational speed of the rotator M2 leads to decrease in the flow rate per unit time of a powdery material falling from the supplier 19 or M5 to the movable portions M21 of the rotator M2 (i.e., density of the powdery material captured and transferred by the movable portions M21). In contrast, decrease in the rotational speed of the rotator M2 leads to increase in density of the powdery material captured and transferred by the movable portions M21 of the rotator M2. Such increase in density of the powdery material, transferred by the rotator M2, causes decrease in the level of the upper surface of the powdery material in the supplier 19 or M5 disposed just above the movable portions M21, whereas decrease in density of the powdery material, transferred by the rotator M2, causes increase in the level of the upper surface of the powdery material in the supplier 19 or M5.

The exemplary embodiment allows the upper surface level of the powdery material in the supplier 19 or M5 to be kept within the constant target range by adjustment of the rotational speed of the rotator M2 in the measurement device M. This stabilizes density of the mixed-powdery materials fed from the supplier 19 or M5 to the movable portions M21 of the rotator M2 (i.e., density of the mixed-powdery materials to be measured by the measurement device M), to keep high accuracy in analysis of the properties of the powdery materials by the measurement device M.

The sensor S3, configured to measure the mixing degree of the mixed-powdery materials captured by the movable portions M21 of the rotator M2, receives particularly transmitted light through the mixed-powdery materials and/or reflected light from the mixed-powdery materials. For analysis of the properties of a powdery material with use of this type of sensor S3, it is quite important to keep density of the powdery material as constant as possible for highly kept analysis accuracy.

Because the powdery-material mixing degree measurement device M further includes a powdery-material remover M4 configured to remove the mixed-powdery materials in the movable portions M21 of the rotator M2 before the mixed-powdery materials reach the discharger M6, when the mixing degree of the mixed-powdery materials captured by the movable portions M21 is out of a predetermined range, there is no need to feed the filling device X of the molding machine with mixed-powdery materials having defective properties in order to keep the quality of molded products compression molded by the molding machine.

The powdery-material mixing degree measurement device M according to the exemplary embodiment is combined with the compression-molding machine to constitute a compression-molding system. The compression-molding machine is exemplarily of a rotary type and is configured to rotate a turret 3 including a table 31 having a die bore 4, and punch retaining portions 32 and 33 vertically slidably retaining punches 5 and 6 disposed above and below the die bore 4, along with the punches 5 and 6, and fill the die bore 4 with a powdery material from a filling device X disposed just above the table 31, to compress the powdery material filled in the die bore 4 with the punches 5 and 6 and obtain a molded product, and the compression molding system further includes a controller C configured to adjust rotational speed of the turret 3 and the punches 5 and 6 to cause the powdery material in a feeding pipe 191 directly connected to the filling device X and configured to be fed with the powdery material discharged from the discharger M6 of the powdery-material mixing degree measurement device M to have an upper surface level kept within a constant target range.

Specifically, the controller increases the rotational speed of the turret 3 and the punches 5 and 6 when the level of the upper surface of the powdery materials in the feeding pipe 191 are not below the upper limit of the target range in comparison to the contrast case, and decreases the rotational speed of the turret 3 and the punches 5 and 6 when the level of the upper surface of the powdery materials in the feeding pipe 191 are not above the lower limit of the target range in comparison to the contrast case.

Increase in the rotational speed of the turret 3 and the punches 5 and 6 in the rotary compression-molding machine leads to increase in an amount of a powdery material used in the molding machine per unit time. In contrast, decrease in the rotational speed of the turret 3 and the punches 5 and 6 leads to decrease in an amount of the powdery material used per unit time. Increase in the amount of the powdery material used per unit time leads to decrease in the level of the upper surface of the powdery material in the feeding pipe 191 directly connected to the filling device X, whereas decrease in the amount of the powdery material used per unit time leads to increase in the level of the upper surface of the powdery material in the feeding pipe 191.

The exemplary embodiment allows the upper surface level of the powdery material in the feeding pipe 191 to be kept within the constant target range by adjustment of the rotational speed of the turret 3 and the punches 5 and 6 of the rotary compression-molding machine. The rotational speed of the turret 3 is decreased to decrease the amount of the used powdery material before the powdery material in the filling device X becomes short, and the rotational speed of the turret 3 is increased to increase the amount of the used powdery material before the powdery material overflows. This prevents a state where the rotary compression-molding machine needs to be stopped.

Constantly keeping the upper surface level of the powdery material in the feeding pipe 191 (or in the filling device X) (i.e., constantly keeping pressure of the powdery material in the filling device X), is effective for continuously filling the die bores 4 with a constant amount of the powdery material from the filling device X. Excessiveness or shortage from the appropriate amount of the powdery material filled in the die bores 4 leads to finished products having hardness, density, and weight different from the desired values. The powdery material filled in the die bores 4 thus needs to have a variation in amount as small as possible. Precise control of the amount of the powdery material filled in the die bores 4 leads to highly kept quality of the obtained molded products.

The upper surface level of the powdery material significantly decreases in the feeding pipe 191 directly connected to the filling device X of the molding machine (or in the filling device X) in an exemplary case where the remover M4 included in the powdery-material mixing degree measurement device M, configured to deliver a powdery material toward the feeding pipe 191, removes a defective powdery material instead of feeding to the feeding pipe 191. In such a case, the rotational speed of the turret 3 and the punches 5 and 6 may be preferably decreased in comparison to a contrast case.

The exemplary invention is not limited to the exemplary embodiment detailed above. In the above exemplary embodiment, the level of the upper surface L1 of the powdery material in the supplier 19 or M5 is detected by the two level switches S61 and S62 and the level of the upper surface L2 of the powdery material in the feeding pipe 191 is detected by the two level switches S71 and S72. The sensors S6 and S7 each configured to detect the level of the upper surface L1 or L2 of the powdery material are, however, not limited to these level switches S61, S62, S71, and S72. Examples of the sensors S6 and S7 also include a contact level gauge configured to directly contact the powdery material accumulated in the supplier 19 or M5 or the feeding pipe 191 and measure the level of the upper surface L1 or L2, and a contactless level gauge configured to emit an ultrasonic wave or an electromagnetic wave toward the upper surface L1 or L2 of the powdery material and receive a reflected wave thereof to measure the level of the upper surface L1 or L2 of the powdery material. The level of the upper surface L1 or L2 of the powdery material can alternatively be obtained by photographing the interior of the supplier 19 or M5 or the feeding pipe 191 with a camera sensor and analyzing a captured image with the controller C.

According to the above exemplary embodiment, the rotational speed of the turret 3 and the punches 5 and 6 of the molding machine is adjusted such that the level of the upper surface L2 of the powdery material in the feeding pipe 191 directly connected to the filling device X is kept within the constant target range. Alternatively, the filling device X can have a level switch or a level gauge configured to obtain a level of the upper surface of the powdery material in the filling device X (particularly in a case where the filling device X is configured as a gravity feeder) to adjust the rotational speed of the turret 3 and the punches 5 and 6 of the molding machine such that the upper surface level of the powdery material in the filling device X is kept within the constant target range.

In this case, the rotational speed of the turret 3 and the punches 5 and 6 is increased if the upper surface level of the powdery material in the filling device X is not lower than the upper limit of the target range, whereas the rotational speed of the turret 3 and the punches 5 and 6 is decreased if the upper surface level of the powdery material in the filling device X is not higher than the lower limit of the target range.

When there are the period of increase in rotational speed of the turret 3 and the punches 5 and 6 to allow the upper surface level of the powdery material in the filling device X to decrease from or above the upper limit of the target range toward the lower limit of the target range and the period of decrease in the rotational speed of the turret 3 and the punches 5 and 6 to allow the upper surface level of the powdery material in the filling device X to increase from or below the lower limit of the target range toward the upper limit of the target range, the controller C preferably controls the rotational speed of the turret 3 and the punches 5 and 6 such that the subsequent second period of increase in speed is longer than the first period of increase in speed, and preferably controls the rotational speed of the turret 3 and the punches 5 and 6 such that the subsequent second period of decrease in speed is longer than the first period of decrease in speed.

The controller C can alternatively conduct a feedback control of precisely adjusting the rotational speed of the rotator M2 of the powdery-material mixing degree measurement device M, or the turret 3 and the punches 5 and 6 of the molding machine in accordance with a degree of difference between the level of the upper surface L1 or L2 of the powdery material detected by the sensor S6 or S7 and the target value (can be a median value, the upper limit, or the lower limit of the target range) so as to keep the level of the upper surface L1 or L2 of the powdery material accumulated in the supplier 19 or M5, or in the feeding pipe 191 or the filling device X within the target range. In a case where the upper surface level of the powdery material is higher than the target value, the rotational speed is decreased as the absolute value of the difference between the upper surface level and the target value is larger. In another case where the upper surface level of the powdery material is lower than the target value, the rotational speed is increased as the absolute value of the difference between the upper surface level and the target value is larger. A controller in a control system embodied by the controller C can be designed in any appropriate manner. Examples of the manner of designing the controller in the control system include various manners such as a Proportional Integral Derivative (PID) control, a model based predictive control, and a learning control.

Alternatively, in order to keep the level of the upper surface L1 or L2 of the powdery material accumulated in the supplier 19 or M5, or in the feeding pipe 191 or the filling device X within the target range, the controller C can measure the flow rate of the powdery material fed to the supplier 19 or M5 or the feeding pipe 191 with a flowmeter and control to increase the rotational speed of the rotator M2, or the turret 3 and the punches 5 and 6 if the flow rate is larger.

Further, in order to keep the level of the upper surface L1 or L2 of the powdery material accumulated in the supplier 19 or M5, or in the feeding pipe 191 or the filling device X within the target range, the controller C can measure a pressure (i.e., from the accumulated powdery material) in the supplier 19 or M5, or in the feeding pipe 191 or the filling device X with a pressure gauge and control to increase the rotational speed of the rotator M2, or the turret 3 and the punches 5 and 6, if the internal pressure is larger.

The specific configuration of each portion can be modified within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A compression-molding system comprising:
a powdery-material mixing degree measurement device, configured to measure a mixing degree of mixed-powdery materials containing at least two types of powdery materials and subsequently deliver the mixed-powdery materials toward a compression-molding machine configured to compression mold the mixed-powdery materials, the powdery-material mixing degree measurement device comprising:
a supplier configured to be fed with the mixed-powdery materials;
a discharger configured to discharge to feed, with the mixed-powdery materials, a filling device configured to fill a die bore of the compression-molding machine with a powdery material;
a rotator including a plurality of movable portions and configured to capture the mixed-powdery materials fed through the supplier and to transfer the mixed-powdery materials to the discharger;
an auxiliary rotator attached to an agitation shaft with the rotator agitating the powdery material and mixing with the rotator;
a first sensor configured to measure the mixing degree of the mixed-powdery materials, that are flowing, captured by the movable portions of the rotator and the auxiliary rotator;
a second sensor configured to detect whether or not the mixed-powdery materials in the supplier have an upper surface level kept within a constant target range;
a third sensor configured to measure the powdery materials captured by the rotator and the movable portions not in motion as well as the powdery materials in the movable portions, and
a controller configured to control the first sensor, the second sensor, and the third sensor, and to adjust a rotational speed of the rotator such that the upper surface level of the mixed-powdery materials in the supplier is kept within the constant target range; and
a compression-molding machine combined with the powdery-material mixing degree measurement device,
wherein the compression-molding machine includes a rotary compression-molding machine and is configured to rotate a turret including a table including the die bore, and punch retaining portions vertically slidably retaining punches disposed above and below the die bore, along with the punches, and fill the die bore with the powdery material from the filling device disposed just above the table, to compress the powdery material filled in the die bore with the punches and to obtain a molded product, and
wherein the compression-molding system further comprises another controller configured to adjust a rotational speed of the turret and the punches by increasing or decreasing the rotational speed at certain rates over different periods of time according to an upper limit and a lower limit of a constant target range to cause the powdery material in a feeding pipe directly connected to the filling device and configured to be fed with the powdery material discharged from the discharger of the powdery-material mixing degree measurement device or in the filling device, to have an upper surface level kept within the constant target range.

2. The compression-molding system according to claim 1, wherein the compression-molding system:
increases the rotational speed of the turret and the punches when the upper surface level of the powdery material in the feeding pipe or in the filling device is equal to or above the upper limit of the constant target range in comparison to when the upper surface level of the powdery material in the feeding pipe or in the filling device is below the upper limit of the constant target range; and decreases the rotational speed of the turret and the punches when the upper surface level of the powdery material in the feeding pipe or in the filling device is not above the lower limit of the target range in comparison to when the upper surface level of the powdery material in the feeding pipe or in the filling device is above the lower limit of the constant target range, wherein the powdery material measured and fed by a first measuring feeder and a second measuring feeder remain in a reservoir in a vertical mixer and are agitated by the auxiliary rotator wherein the controller controls the third sensor to measure the powdery materials captured by the rotator and the movable portions not in motion as well as the powdery materials in the movable portions have stabilized density, while the controller controls the first sensor to measure the mixing degree of powdery materials that are flowing in a pipe.

3. The compression-molding system according to claim 1, wherein the compression-molding system increases the rotational speed of the turret and the punches when the upper surface level of the powdery material in the feeding pipe is equal to or above the upper limit of the constant target range in comparison to when the upper surface level of the powdery material in the feeding pipe is below the upper limit of the constant target range, wherein a powdery-material passing member at a reservoir is disposed below a first case and includes a plurality of bores, the powdery material passing through the bores of the powdery-material passing member is discharged from a discharge port, wherein the controller causes the rotator to temporarily stop rotation when the third sensor, controlled by the controller, measures the mixing degree of the powdery materials captured by the movable portions.

4. The compression-molding system according to claim 1, wherein the compression-molding system increases the rotational speed of the turret and the punches when the upper surface level of the powdery material in the filling device is equal to or above the upper limit of the constant target range in comparison to when the upper surface level of the powdery material in the filling device is below the upper limit of the r constant target range, wherein a powdery material passing through bores of a powdery-material passing member in a first vertical mixer is fed to a horizontal mixer by a connecting pipe, wherein the controller controls the rotator to intermittently rotate according to the detection by the third sensor.

5. The compression-molding system according to claim 1, wherein the compression-molding system decreases the rotational speed of the turret and the punches when the upper surface level of the powdery material in the feeding pipe is not above the lower limit of the constant target range in comparison to when the upper surface level of the powdery material in the feeding pipe is above the lower limit of the constant target range, further comprising a horizontal mixer including the auxiliary rotator that rotates about an agitation shaft disposed substantially horizontally, to mix the powdery material.

6. The compression-molding system according to claim 1, wherein the compression-molding system decreases the rotational speed of the turret and the punches when the upper surface level of the powdery material in the filling device is not above the lower limit of the constant target range in comparison to when the upper surface level of the powdery material in the filling device is above the lower limit of the constant target range, further comprising a vertical mixer and a horizontal mixer, wherein the powdery material is fed to a vertical mixer so as to be mixed after a second mixing by a horizontal mixer.

7. The powdery-material mixing degree measurement device according to claim 1, wherein the first sensor receives transmitted light through the mixed-powdery materials to measure the mixing degree of the mixed-powdery materials captured by the movable portions of the rotator.

8. The powdery-material mixing degree measurement device according to claim 1, wherein the first sensor receives reflected light from the mixed-powdery materials to measure the mixing degree of the mixed-powdery materials captured by the movable portions of the rotator.

9. The compression-molding system according to claim 1, wherein the compression-molding system includes the controller configured to adjust the rotational speed of the rotator such that the upper surface level of the mixed-powdery materials in the supplier is kept within the constant target range to stabilize density of the mixed-powdery materials fed from the supplier to the plurality of movable portions of the rotator, wherein the upper surface level of the mixed-powdery material in the supplier is kept within the constant target range by adjustment of the rotational speed of the rotator in the powdery-material mixing degree measurement device by the controller.

10. The compression-molding system according to claim 1, wherein the rotational speed of the rotator is increased when the upper surface level of the mixed-powdery materials in the supplier is equal to or more than an upper limit of the constant target range in comparison to when the upper surface level of the mixed-powdery materials in the supplier is less than the upper limit of the constant target range, and wherein the rotational speed of the rotator is decreased when the upper surface level of the mixed-powdery materials in the supplier is equal to or less than a lower limit of the constant target range in comparison to when the upper surface level of the mixed-powdery materials in the supplier is more than the lower limit of the constant target range.

11. The compression-molding system according to claim 10, wherein the first sensor, configured to measure the mixing degree of the mixed-powdery materials captured by the movable portions of the rotator, receives transmitted light through the mixed-powdery materials or reflected light from the mixed-powdery materials.

12. The compression-molding system according to claim 11, wherein the powdery-material mixing degree measurement device further comprises a powdery-material remover configured to remove the mixed-powdery materials in the movable portions of the rotator before the mixed-powdery materials reach the discharger, when the mixing degree of the mixed-powdery materials captured by the movable portions is out of a predetermined range.

13. The compression-molding system according to claim 10, wherein the powdery-material mixing degree measurement device further comprises a powdery-material remover configured to remove the mixed-powdery materials in the movable portions of the rotator before the mixed-powdery materials reach the discharger, when the mixing degree of the mixed-powdery materials captured by the movable portions is out of a predetermined range.

14. The compression-molding system according to claim 1, wherein the first sensor, configured to measure the mixing degree of the mixed-powdery materials captured by the movable portions of the rotator, receives transmitted light through the mixed-powdery materials or reflected light from the mixed-powdery materials.

15. The compression-molding system according to claim 14, wherein the powdery-material mixing degree measurement device further comprises a powdery-material remover configured to remove the mixed-powdery materials in the movable portions of the rotator before the mixed-powdery materials reach the discharger, when the mixing degree of the mixed-powdery materials captured by the movable portions is out of a predetermined range.

16. The compression-molding system according to claim 1, wherein the powdery-material mixing degree measurement device further comprises a powdery-material remover configured to remove the mixed-powdery materials in the movable portions of the rotator before the mixed-powdery materials reach the discharger, when the mixing degree of the mixed-powdery materials captured by the movable portions is out of a predetermined range.

17. A compression-molding system comprising:
   a powdery-material mixing degree measurement device, configured to measure a mixing degree of mixed-powdery materials containing at least two types of powdery materials and subsequently deliver the mixed-powdery materials toward a compression-molding machine configured to compression mold the mixed-powdery materials, the powdery-material mixing degree measurement device including:
      a supplier configured to be fed with the mixed-powdery materials;
      a discharger configured to discharge to feed, with the mixed-powdery materials, a filling device configured to fill a die bore of the compression-molding machine with a powdery material;
      a rotator including a plurality of movable portions and configured to capture the mixed-powdery materials fed through the supplier and to transfer the mixed-powdery materials to the discharger;
      an auxiliary rotator attached to an agitation shaft with the rotator agitating the powdery material and mixing with the rotator;
      a plurality of sensors that are configured to measure the mixing degree of the mixed-powdery materials, that are flowing, captured by the movable portions of the rotator and the auxiliary rotator, detect whether or not the mixed-powdery materials in the supplier have an upper surface level kept within a constant target range, measures the powdery materials captured by the rotator and the movable portions not in motion as well as the powdery materials in the movable portions;
      a controller configured to control the plurality of sensors, and to adjust a rotational speed of the rotator such that the upper surface level of the mixed-powdery materials in the supplier is kept within a constant target range; and
   a compression-molding machine combined with the powdery-material mixing degree measurement device,
   wherein the compression-molding machine includes a rotary compression-molding machine and is configured to rotate a turret including a table including the die bore, and punch retaining portions vertically slidably retaining punches disposed above and below the die bore, along with the punches, and fill the die bore with the powdery material from the filling device disposed just above the table, to compress the powdery material filled in the die bore with the punches and to obtain a molded product, and
   wherein the compression-molding system further comprises another controller configured to adjust a rotational speed of the turret and the punches by increasing or decreasing the rotational speed at certain rates over different periods of time according to an upper limit and a lower limit of a constant target range to cause the powdery material in a feeding pipe directly connected to the filling device and configured to be fed with the powdery material discharged from the discharger of the powdery-material mixing degree measurement device or in the filling device, to have an upper surface level kept within the constant target range.

18. The compression-molding system according to claim 17, wherein the compression-molding system:
   increases the rotational speed of the turret and the punches when the upper surface level of the powdery material in the feeding pipe or in the filling device is equal to or above the upper limit of the constant target range in comparison to when the upper surface level of the powdery material in the feeding pipe or in the filling device is below the upper limit of the constant target range; and
   decreases the rotational speed of the turret and the punches when the upper surface level of the powdery material in the feeding pipe or in the filling device is not above the lower limit of the target range in comparison to when the upper surface level of the powdery material in the feeding pipe or in the filling device is above the lower limit of the constant target range,
   wherein the controller controls one of the plurality of sensors to measure the powdery materials captured by the rotator and the movable portions not in motion as well as the powdery materials in the movable portions have stabilized density, while the controller controls another one of the plurality of sensors to measure the mixing degree of powdery materials that are flowing in a pipe.

19. The compression-molding system according to claim 17, wherein the compression-molding system increases the rotational speed of the turret and the punches when the upper surface level of the powdery material in the feeding pipe is equal to or above the upper limit of the constant target range in comparison to when the upper surface level of the powdery material in the feeding pipe is below the upper limit of the constant target range, and
   wherein the controller causes the rotator to temporarily stop rotation when at least one of the plurality of sensors, controlled by the controller, measures the mixing degree of the powdery materials captured by the movable portions.

20. The compression-molding system according to claim 17, wherein the compression-molding system increases the rotational speed of the turret and the punches when the upper surface level of the powdery material in the filling device is equal to or above the upper limit of the constant target range in comparison to when the upper surface level of the powdery material in the filling device is below the upper limit of the constant target range, and
   wherein the controller controls the rotator to intermittently rotate according to the detection by at least one of the plurality of sensors.

* * * * *